(12) United States Patent
Huffman

(10) Patent No.: US 11,743,273 B2
(45) Date of Patent: Aug. 29, 2023

(54) BOT HUNTING SYSTEM AND METHOD

(71) Applicant: T-Mobile USA, Inc., Bellevue, WA (US)

(72) Inventor: Joseph Kim Huffman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 352 days.

(21) Appl. No.: 17/122,458

(22) Filed: Feb. 25, 2021

(65) Prior Publication Data
US 2022/0272108 A1 Aug. 25, 2022

(51) Int. Cl.
G06F 17/18 (2006.01)
H04L 9/40 (2022.01)
(52) U.S. Cl.
CPC .......... *H04L 63/1416* (2013.01); *G06F 17/18* (2013.01); *H04L 63/1425* (2013.01); *H04L 63/1466* (2013.01)
(58) Field of Classification Search
CPC ............. H04L 63/1416; H04L 63/1425; H04L 2463/121; H04L 63/1466; H04L 2463/141; H04L 2463/142; H04L 2463/143; H04L 2463/144; G06F 17/18
See application file for complete search history.

(56) References Cited

U.S. PATENT DOCUMENTS

| | | | |
|---|---|---|---|
| 10,673,886 B1* | 6/2020 | Mezic | .............. G06F 21/577 |
| 10,826,920 B1* | 11/2020 | Lin | ............... H04L 63/0236 |
| 10,983,888 B1* | 4/2021 | Giuliano | .......... G06F 11/3476 |
| 2008/0126538 A1* | 5/2008 | Uyama | ........... G06Q 30/0202 |
| | | | 709/224 |
| 2016/0134651 A1* | 5/2016 | Hu | .................. H04L 63/1416 |
| | | | 726/23 |
| 2019/0007432 A1* | 1/2019 | Tauschinsky | ........ G06F 17/18 |
| 2020/0106805 A1* | 4/2020 | Gronát | ............... G06N 3/084 |

* cited by examiner

*Primary Examiner* — Farid Homayounmehr
*Assistant Examiner* — Mudasiru K Olaegbe
(74) *Attorney, Agent, or Firm* — Loeb & Loeb LLP

(57) ABSTRACT

The system and method may look for bots using statistics. At a high level, bots communicate back and forth to a command and control computer. The communications are at somewhat random times by design to not be obvious. Using expected probability of a normal distribution rather than simply analyzing time of communications may result in better bot recognition.

20 Claims, 38 Drawing Sheets

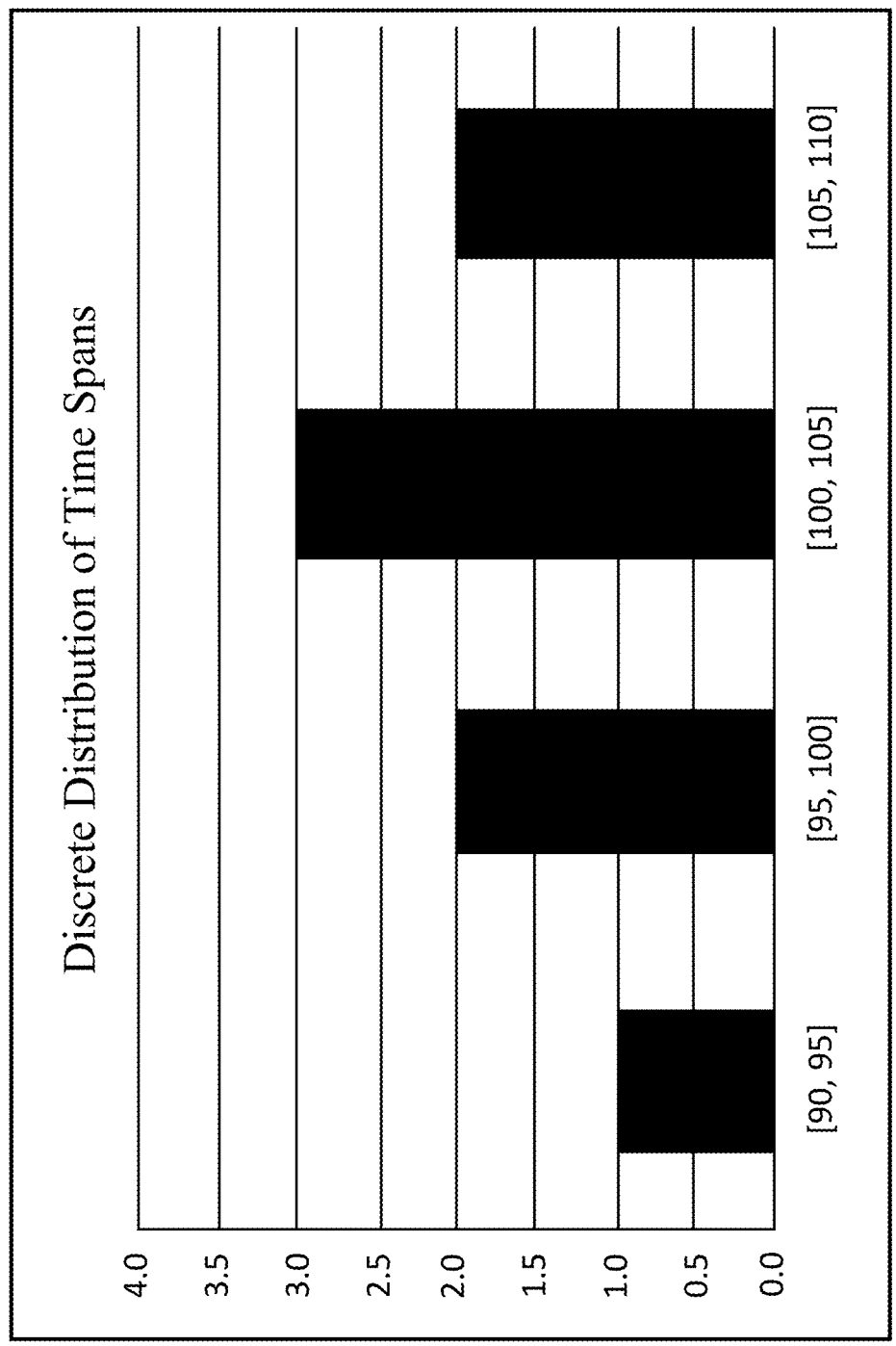
Graph 2. The discrete time span distribution of the beacons in Table 1.
FIG. 2AA1

Graph 3. Probability distribution with equal width bins one second wide.

Graph 4. Probability distribution with equal width bins one second wide on a log scale X axis.

Graph 5. Probability distribution one second wide bins with a two to six second period beacon.

Graph 6. Probability distribution with increasing size bins and a logarithmic X axis.

Graph 8. Kibana visualization of the Cyber Security Data Platform data of the bot shown in Graph 7.

Graph 9. Difficult to find beaconing behavior.

Graph 10. Kibana view of the same data shown in Graph 9.

Graph 11. Probability distribution between two computers without bot beaconing behavior.

Graph 12. A second probability distribution between two computers without bot beaconing behavior.

Graph 13. A third probability distribution between two computers without bot beaconing behavior.

Graph 14. A Bot Score of 66.5 and a RITA timestamp score of 0.488.

Graph 15. A Bot Score of 95.5 and a RITA timestamp score of 0.588.

Graph 17. A Bot Score of 0.9 and a RITA timestamp score of 0.877.

Graph 18. A Bot Score of 0.9 and a RITA timestamp score of 0.830.

Graph 19. A Bot Score of 4.9 and a RITA timestamp score of 0.498.

Graph 20. A bot score of 0.4 and a RITA timestamp score of 0.826.

Graph 21. A bot score of 2.3 and a RITA timestamp score of 0.784.

Graph 22. A bot score of 2.7 and a RITA timestamp score of 0.599.

Graph 23. A bot score of 7.2 and a RITA timestamp score of 0.532.

Graph 24. A bot score of 10.7 and a RITA timestamp score of 0.513.

Graph 25. A bot score of 16.7 and a RITA timestamp score of 0.364.

Graph 26. A bot score of 21.1 and a RITA timestamp score of 0.520.

Graph 27. A bot score of 25.0 and a RITA timestamp score of 0.671.

Graph 28. A bot score of 27.0 and a RITA timestamp score of 0.207.

Graph 29. A bot score of 35.7 and a RITA timestamp score of 0.809.

Graph 30. A bot score of 45.7 and a RITA timestamp score of 0.445.

Graph 31. A bot score of 54.5 and a RITA timestamp score of 0.308.

Graph 32. A bot score of 81.8 and a RITA timestamp score of 0.511.

Graph 33. A bot score of 92.3 and a RITA timestamp score of 0.581.

Graph 34. A bot score of 127.2 and a RITA timestamp score of 0.588.

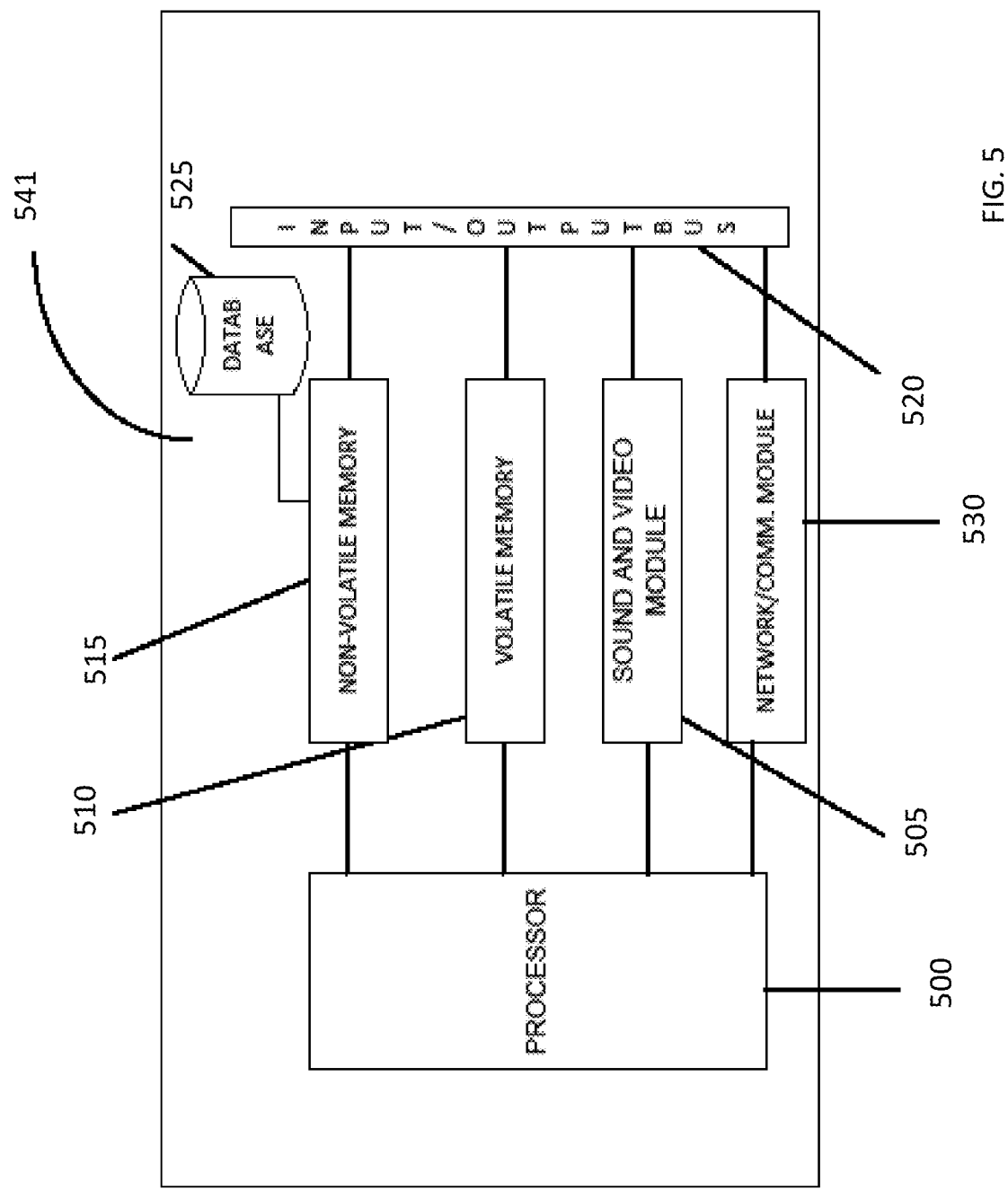

BOT HUNTING SYSTEM AND METHOD

BACKGROUND

For a variety of reasons, outsiders to a network may place automated pieces of code on a network. The automated pieces of code may be known as "bots" and the bots may be controlled by a command and control computer to which the bot communicates. The bots may attempt to be hidden in the hopes of collecting and forwarding information to the command and control computer without the network authority realizing that a bot is operating. Considering the amount of computer executable instructions on a common network and the many ways to access a network, sophisticated bots are difficult to locate. However, as bots have to communicate over a network, watching network communications may be a way to determine if bots are present. Logically, bots realize network communications may be monitored so the bots may attempt to communicate in a manner that is difficult to detect.

SUMMARY

The system and method may look for bots using a statistical approach. At a high level, bots communicate back and forth to a command and control computer. The communications are at somewhat random times by design to not be obvious. Using expected probability of a normal distribution rather than simply analyzing time of communications may result in better bot recognition. Spreading the communication timestamps over a log based x axis scale, the communications become more evenly spread out. Then, comparing the frequency of all communications (including bots) to a Gaussian (bell curve) distribution, bot communications become apparent. The comparison of the suspect bot communications to a bell curve distribution creates a number and that number is a good indication if a communication is from a bot. For example, if the bell curve indicates there should be 500 communications at time stamp 63 and there are 1500 communications at time stamp 63, it is likely a bot is programmed to communicate at time stamp 63.

BRIEF DESCRIPTION OF THE FIGURES

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

FIG. 2AA may display Graph 3 which displays the probability distribution of connection data with one second wide bins and a range of 0 to 10,000 seconds;

FIG. 2AB may display Graph 4 which illustrates the results of changing the X axis to a logarithmic scale;

FIG. 2AC may display Graph 5 which illustrates what happens when the period of the beacon is changed to be between two and six seconds using this representation;

FIG. 2AD may display Graph 6 and Graph 7 and illustrate nearly pure beacons in a network discovered by the system and method;

FIG. 2AE may display Graph 7 and illustrate nearly pure beacons in a network discovered by the system and method;

FIG. 2AF may display Graph 8 and illustrate the data of FIG. 2AE in a different form;

FIG. 2AG may display Graph 9 which is a more difficult bot to locate;

FIG. 2AH may display Graph 10 which is a different view of the data of FIG. 2AG/Graph 9;

FIG. 2AI may display Graph 11 which may be a probability distribution between two computers without bot beaconing behavior;

FIG. 2AJ may display Graph 12 which may be a probability distribution between two computers without bot beaconing behavior;

FIG. 2AK may display Graph 13 which may be a probability distribution between two computers without bot beaconing behavior;

FIG. 2AL may display Graph 14 which may have a Bot Score of 66.5 and a RITA timestamp score of 0.488;

FIG. 2AM may display Graph 15 which may illustrate a Bot Score of 95.5 and a RITA timestamp score of 0.588;

FIG. 2AN may display Graph 16 which may illustrate a Bot Score of 54.5 and a RITA timestamp score of 0.308;

FIG. 2AO may display Graph 17 which may illustrate a Bot Score of 0.9 and a RITA timestamp score of 0.877;

FIG. 2AP may display Graph 18 which may illustrate a Bot Score of 0.9 and a RITA timestamp score of 0.830;

FIG. 2AQ may display Graph 19 which may illustrate a Bot Score of 4.9 and a RITA timestamp score of 0.498;

FIG. 2AR may display Graph 20 which may illustrate a bot score of 0.4 and a RITA timestamp score of 0.826;

FIG. 2AS may display Graph 21 which may illustrate a bot score of 2.3 and a RITA timestamp score of 0.784;

FIG. 2AT may display Graph 22 which may illustrate a bot score of 2.7 and a RITA timestamp score of 0.599;

FIG. 2AU may display Graph 23 which may illustrate a bot score of 7.2 and a RITA timestamp score of 0.532;

FIG. 2AV may display Graph 24 which may illustrate a bot score of 10.7 and a RITA timestamp score of 0.513;

FIG. 2AW may display Graph 25 which may illustrate a bot score of 16.7 and a RITA timestamp score of 0.364;

FIG. 2AX may display Graph 26 which may illustrate a bot score of 21.1 and a RITA timestamp score of 0.520;

FIG. 2AY may display Graph 27 which may illustrate a bot score of 25.0 and a RITA timestamp score of 0.671;

FIG. 2AZ may display Graph 27 which may illustrate a bot score of 25.0 and a RITA timestamp score of 0.671;

FIG. 2BB may display Graph 30 which may illustrate a bot score of 45.7 and a RITA timestamp score of 0.445;

FIG. 2BC may display Graph 31 which may illustrate a bot score of 54.5 and a RITA timestamp score of 0.308;

FIG. 2BD may display Graph 32 which may illustrate a bot score of 81.8 and a RITA timestamp score of 0.511;

FIG. 2BE may display Graph 33 which may illustrate a bot score of 92.3 and a RITA timestamp score of 0.581;

FIG. 2BF may display Graph 34 which may illustrate a bot score of 127.2 and a RITA timestamp score of 0.588;

FIG. 5 illustrates a sample server computing device.

SPECIFICATION

Figure 1:
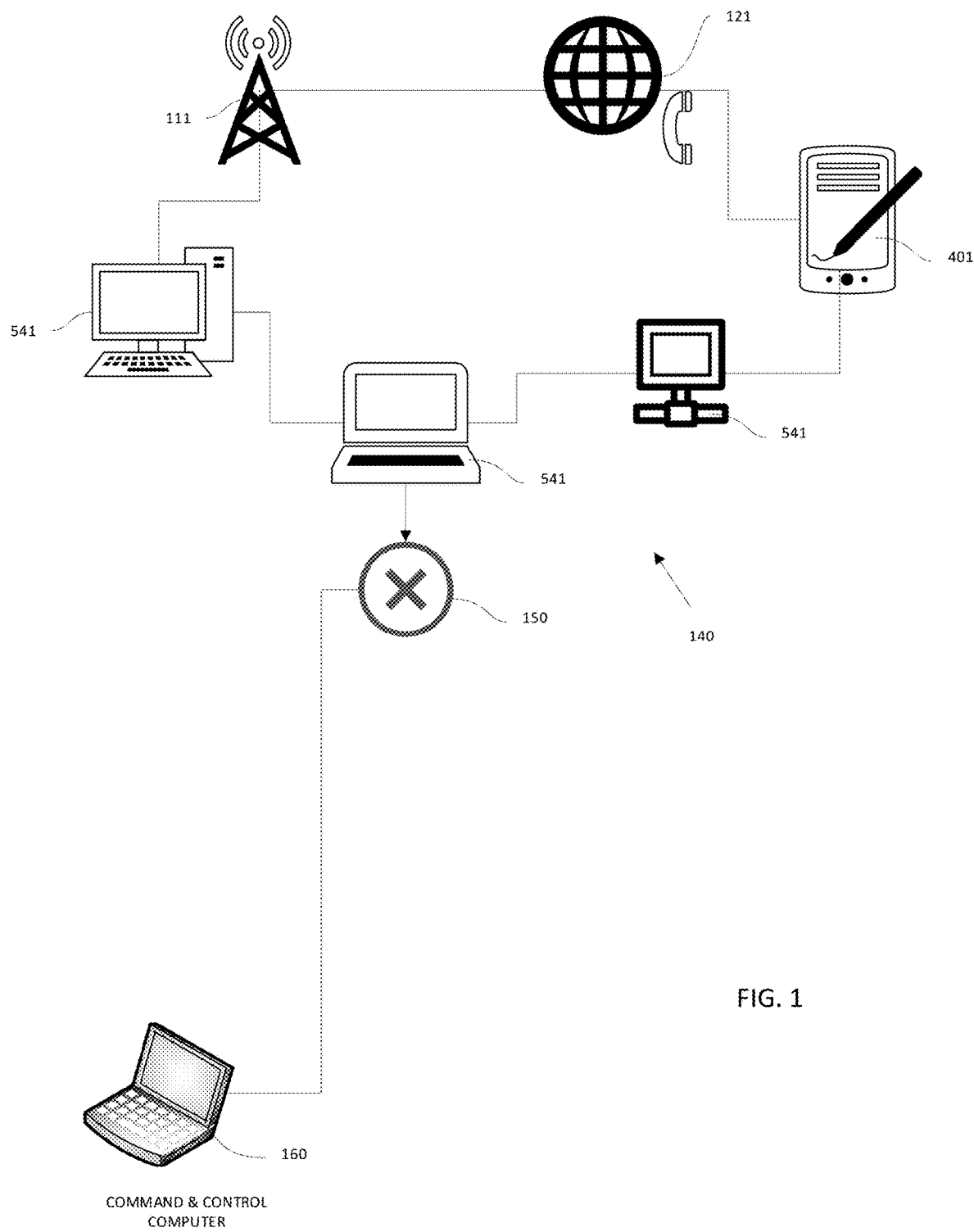
FIG. 1 illustrates a sample network with a bot.

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

For a variety of reasons, outsiders to a network may place automated pieces of code on a network. The automated pieces of code may be known as "bots" 150. At a high level, bots 150 may collect data on the network and communicate the data back and forth to a command and control computer 160. The bots 150 may be controlled by the command and control computer 160 to which the bot 150 communicates. The bots 150 may attempt to be hidden in the hopes of collecting and forwarding information to the command and control computer 160 without the network authority realizing that a bot 150 is operating. The communications are at somewhat random times by design to not be obvious. Many bot 150 communications are very quick, such in milliseconds and other are over hours. Considering the amount of computer executable instructions on a common network and the many ways to access a network, sophisticated bots are difficult to locate. However, as bots 150 have to communicate over a network, watching network communications may be a way to determine if bots 150 are present.

Logically, bots 150 realize network communications may be monitored so the bots 150 may attempt to communicate in a manner that is difficult to detect. The detection of a bot 150 may be accomplished by looking for "beaconing behavior" on a network such as when a bot 150 installed on a computer 541 repeatedly contacts a remote Command and Control (C2) server 160 for instructions and/or to deliver stolen data. These repeated contacts may be considered "beaconing behavior".

At a high level, the system and method may spread all network communication timestamps over a log based x axis scale, and the communications may become more evenly spread out across the x axis scale. Then, the frequency of all communications (including bots) may be compared to a Gaussian (bell curve) distribution and bot communications may become apparent. The comparison of the suspect bot communications to a bell curve distribution may be used to create a number and that number may be a good indication if a communication is from a bot. For example, if the bell curve indicates there should be 500 communications at time stamp 63 and there are 1500 communications at time stamp 63, it is likely a bot is programmed to communicate at time stamp 63.

Referring to FIG. 1, a sample network 140 may be illustrated. The network 140 may have a variety of wired and wireless computing devices that connect to the network 140 such as mobile computing devices 401 and server type computing device 541. The network 140 may have a variety of ingress and egress points such as wireless access 111, IP based phone systems 121, emails, file transfers, web access, virtual private networks, etc. Any of these ingress and egress points may allow a bot 150 to access and establish a presence on a network. For example, opening an attachment to an email may cause computer code to execute and allow the bot to ingress to network. Once on the network 140, the bot will communicate to a command and control computer 160 and the command and control computer 160 may instruct the bot 150 on aspects of its operations.

Figure 2:
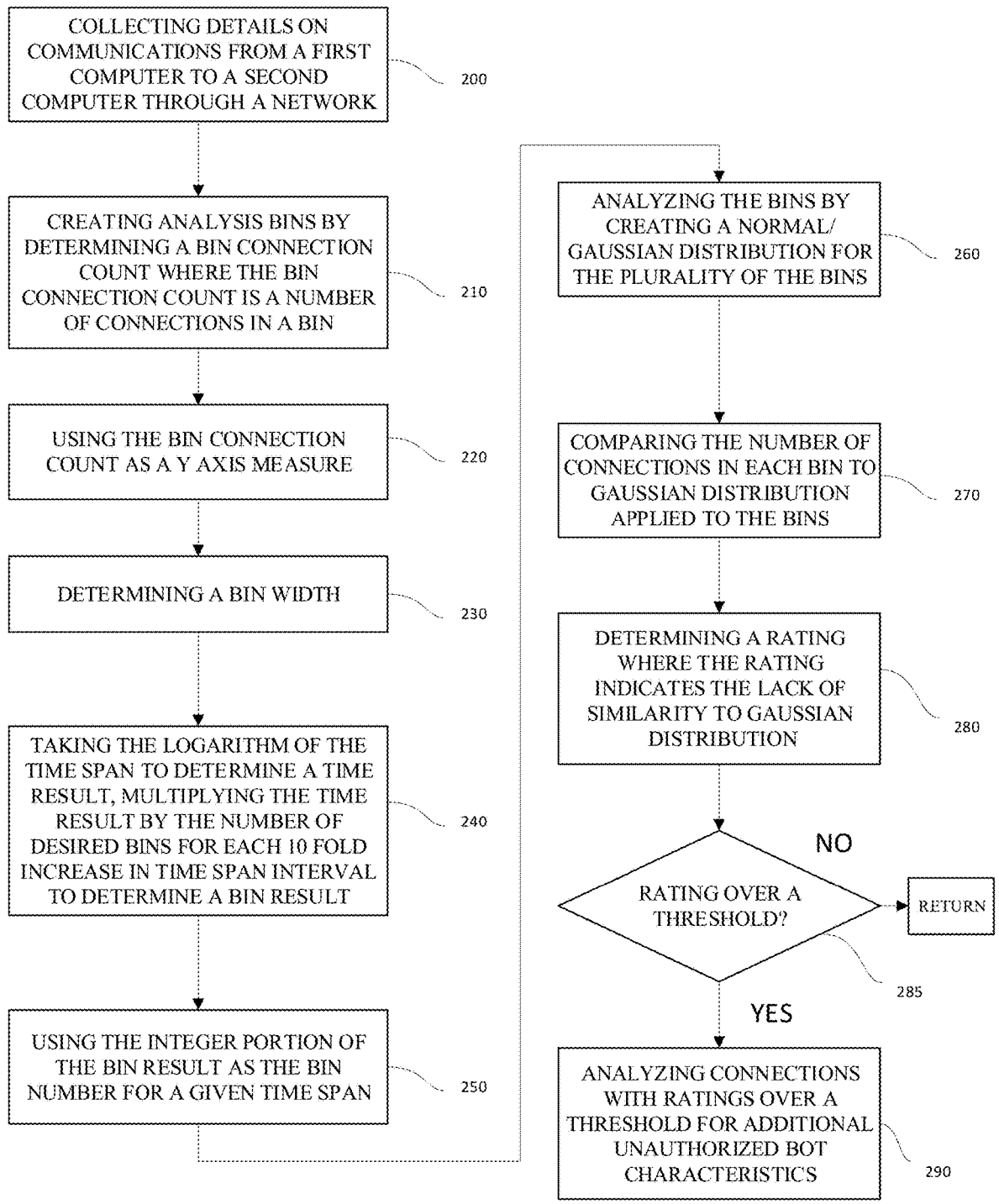
FIG. 2 illustrates a method of analyzing network communications to identify probable bot communications.

FIG. 2 may illustrate a method of identifying unauthorized bots communications. At block 200, details on communications from a first computer to a second computer through a network 140 may be collected. Details on communication may include a timestamp for the communications from a first computer to a second computer through a network 140.

The system and method may use probability mathematics to help find bots. Most bot communication differs, in measurable ways, from normal computer communication. The system and method may not use time histograms but may use statistics and these statistics may not be in the time domain. Both the visualization and statistics may be in the in the domain of probability distributions and densities derived, on the fly, from the actual connection data between a computer and suspected Command and Control Servers.

The use of probability mathematics may not only defeat many bot behavioral changes, it also may obtain actionable results with as few as 500 connections between the bot and the command and control server. Thousands of connections may not be required.

At block 210, analysis bins may be created by determining a bin connection count where the bin connection count may be a number of connections in a bin. In one embodiment, a simple discrete distribution for the connection time data may be to put the connection time differences into equally sized bins. For example, if the bin sizes were five seconds wide, then with the time stamps of each beacon shown in Table 1 (below), the result may be the distribution shown in Graph 2 which may be displayed in FIG. 2AA1. This approach may be a simple example of the way the system and method may display timestamp intervals in its alternate view of timestamp interval data. The Y axis in the graph may be the count of number of beacons with time spans which fell into the bin locations show on the X axis.

TABLE 1

| Beacon Timestamp in Seconds | Time Span |
|---|---|
| 0 | |
| 101 | 101 |
| 210 | 109 |
| 300 | 90 |
| 404 | 104 |
| 500 | 96 |

TABLE 1-continued

| Beacon Timestamp in Seconds | Time Span |
|---|---|
| 599 | 99 |
| 705 | 106 |
| 808 | 103 |

At block 220, the bin connection count may be used as a y axis measure. The bin connection count may be useful for some types of measurements but not for finding bots 150. The system and method may need the data to be normalized so data sets of different sizes can be easily compared. The data may be normalized by dividing the number of beacon timestamp intervals in each bin by the total number of them such that the y axis represent the fraction of beacons which fall into each bin. The graph may then become a discrete probability distribution graph.

If the range of time spans between connections between computers were limited to a few seconds to a minute or two, then equal bin sizes may be used with relatively few adverse effects. That may not be the case with network 140 traffic. The time span between connections may be a millisecond or less or it may be weeks or even months. For the problem space the system and method analyzes, beaconing to command and control servers, the time span is a fraction of a second to perhaps one day. Equal size bins may not work because the bins near the short time spans may have far more events than the bins at the long-time spans. Graph 3 may illustrate the imbalance in bins follow the equal sized bin approach. Also, the number of bins may become enormous for the time spans system and method analyzes. Another transformation may be required.

Figure 2A:
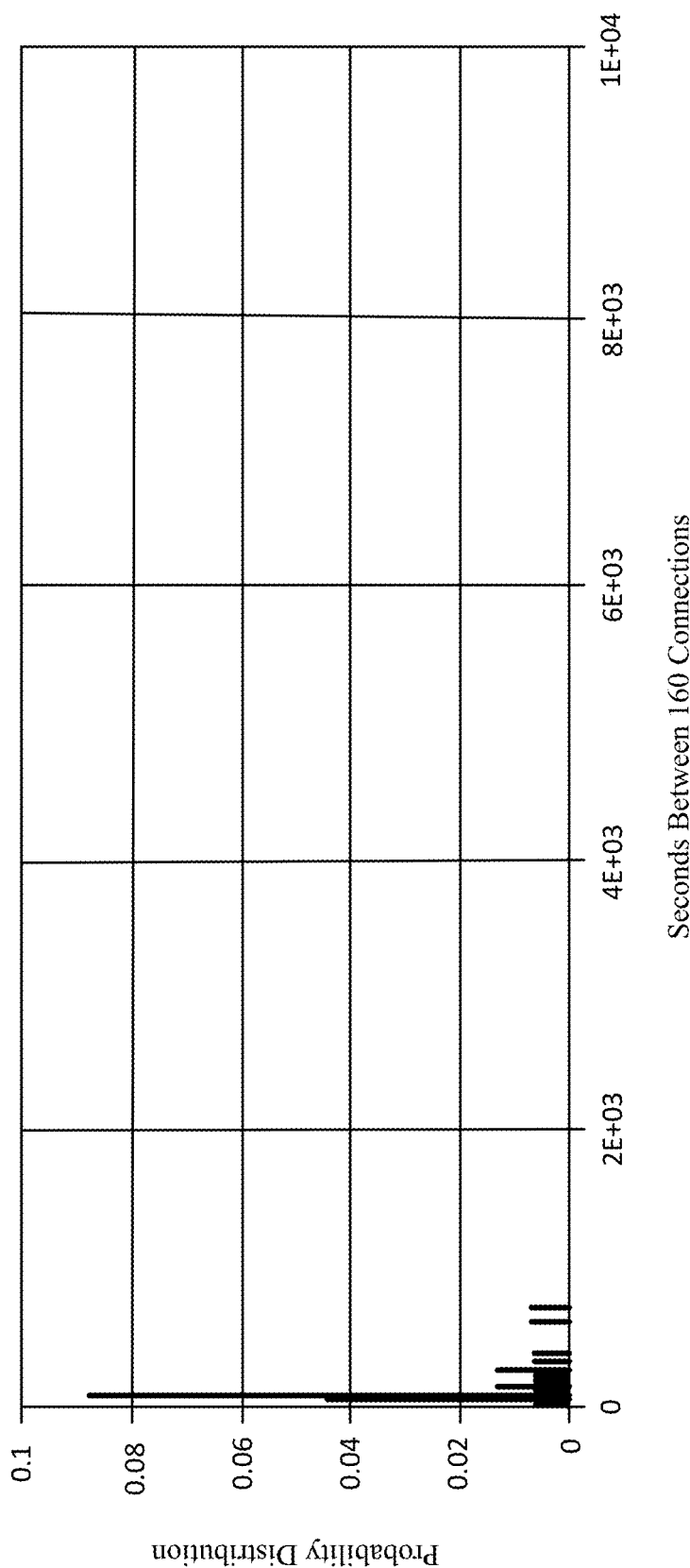
FIG. 2AA1 may illustrate Graph 2 which may illustrate discrete time span distributions of beacons.
Figure 2A:
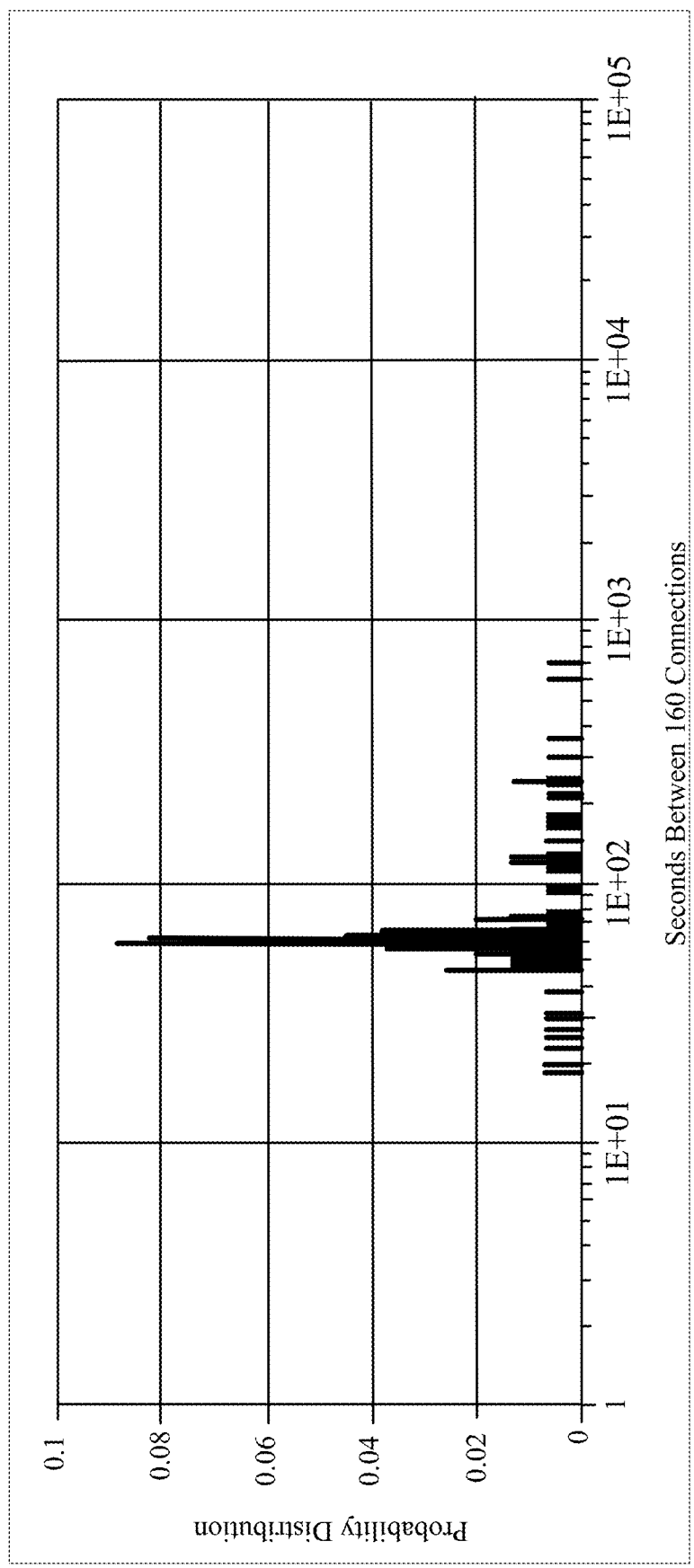
Figure 2A:
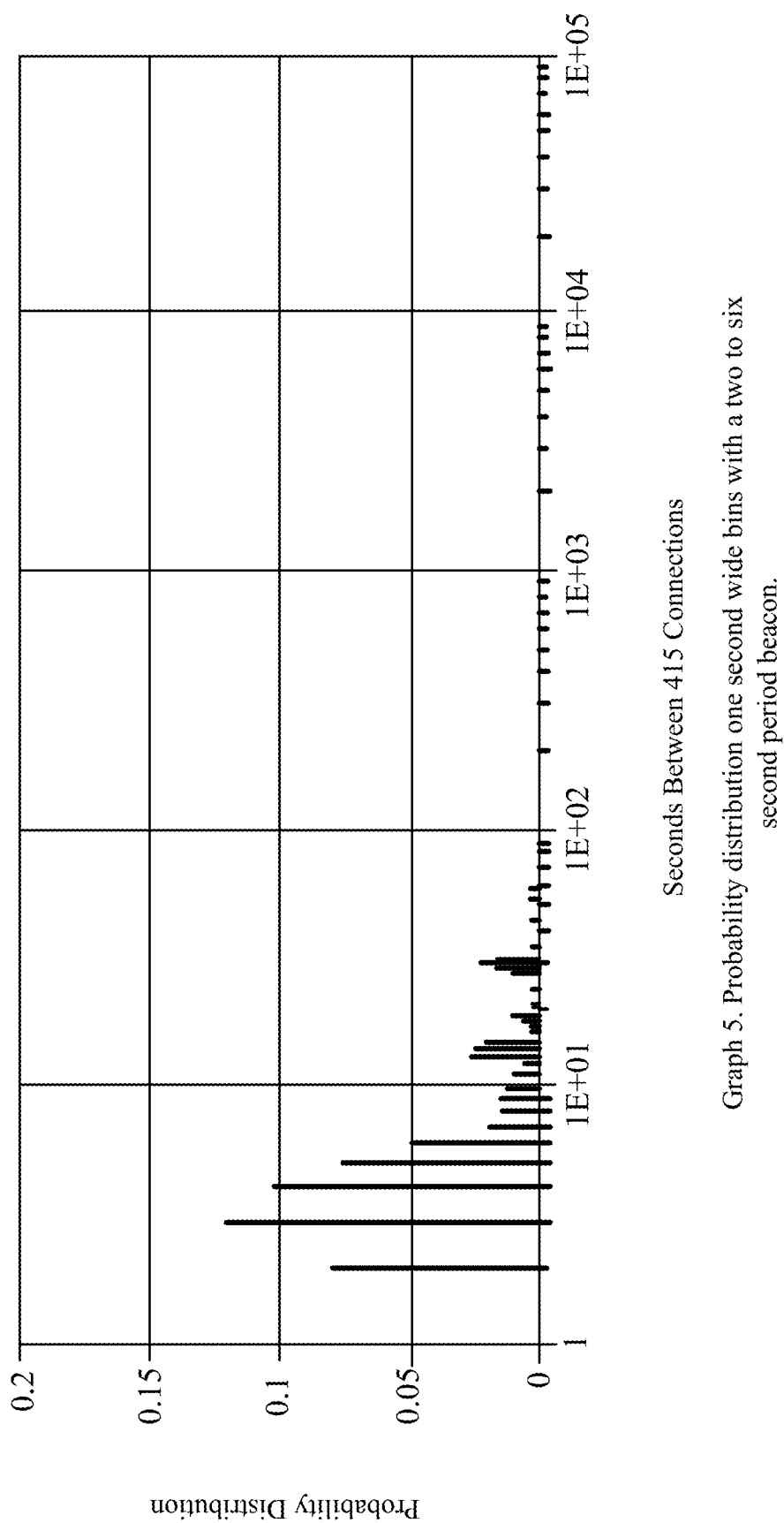
Figure 2A:
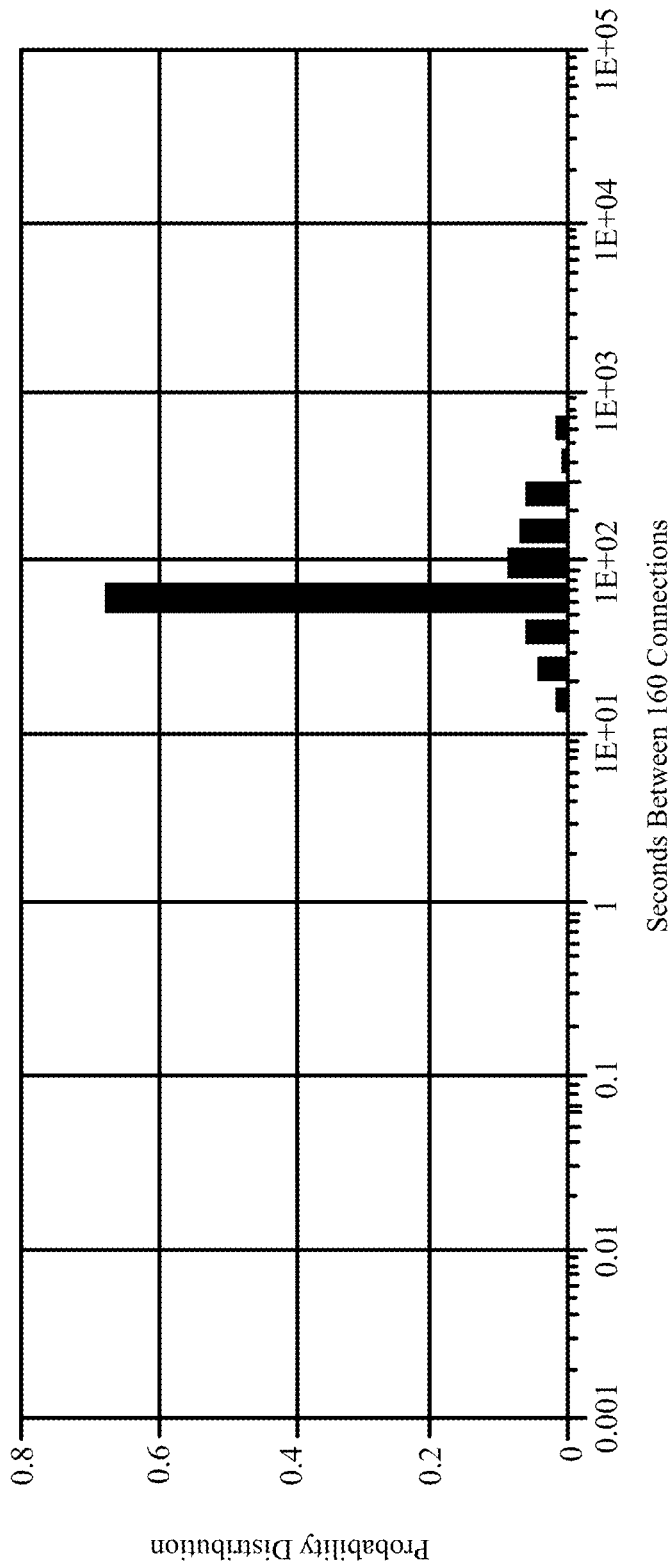
Figure 2A:
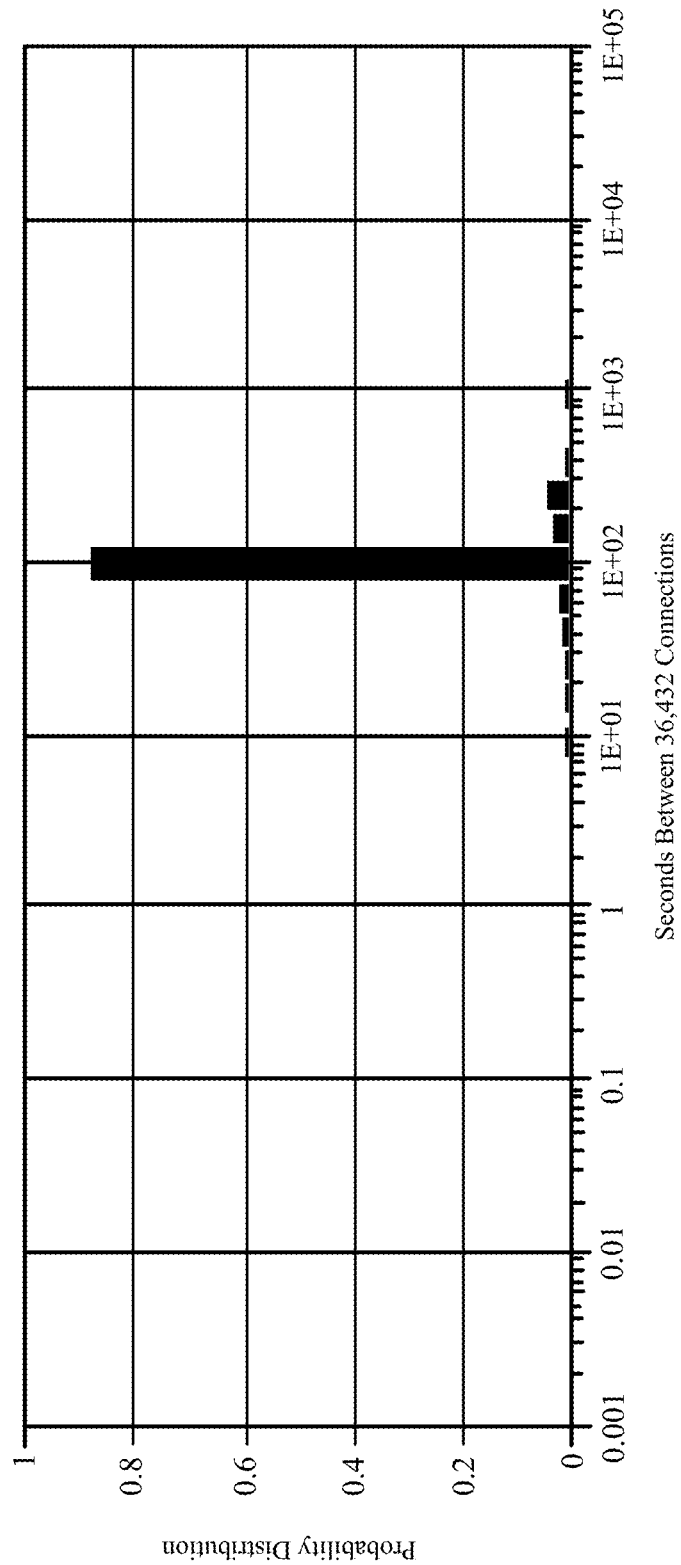
Figure 2A:
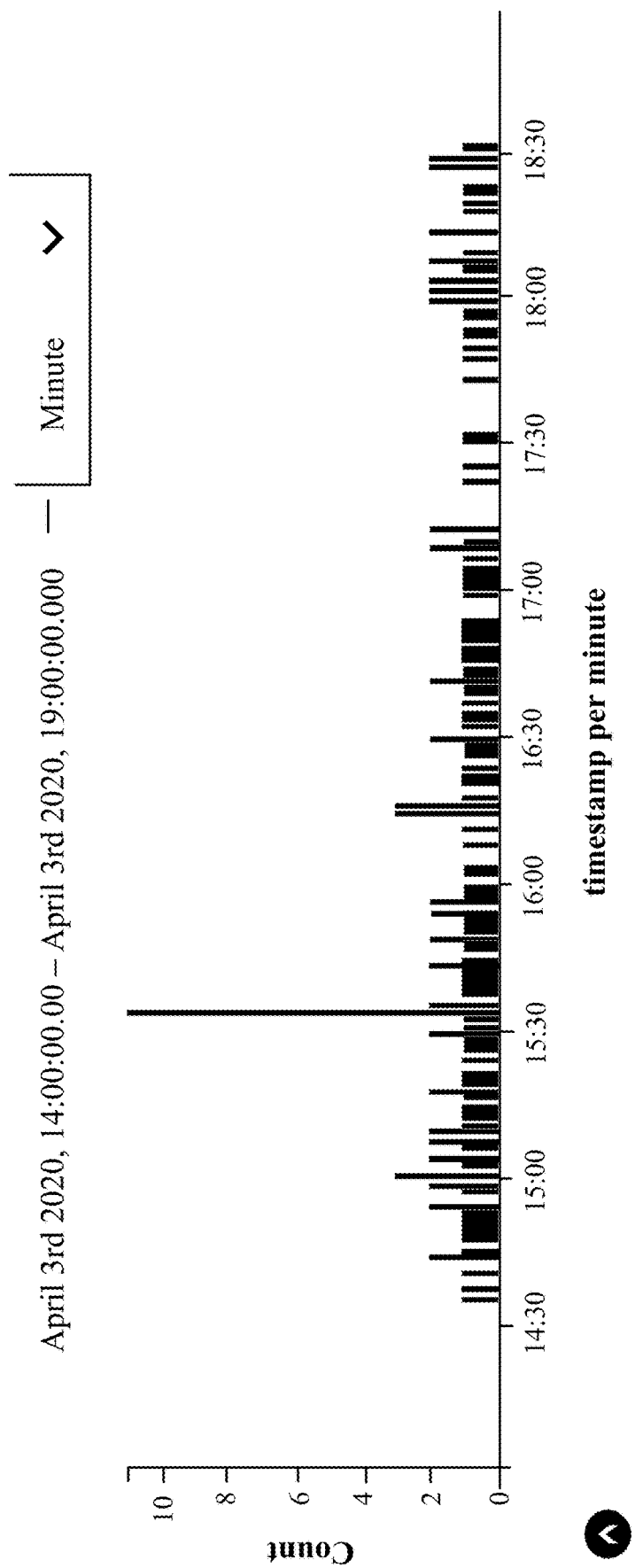
Figure 2A:
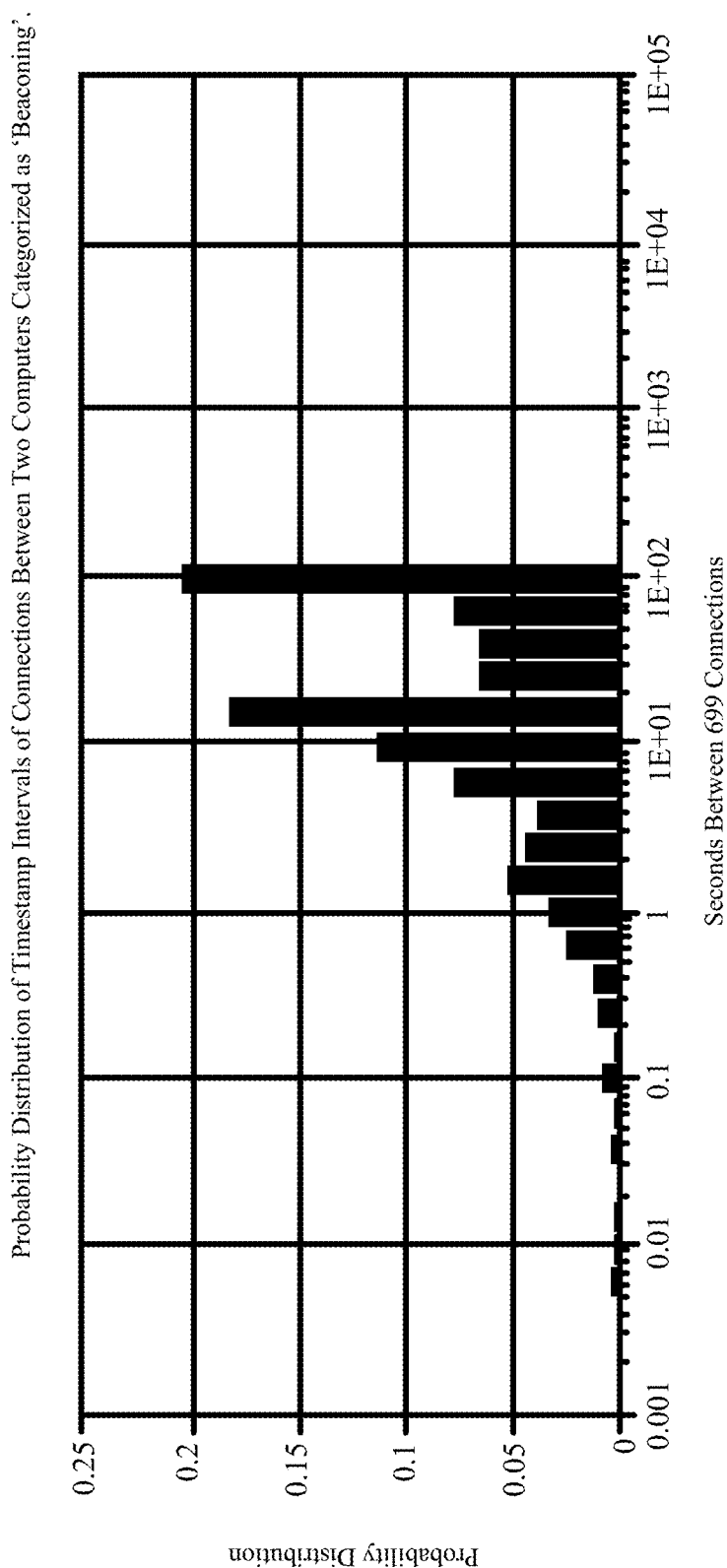
Figure 2A:
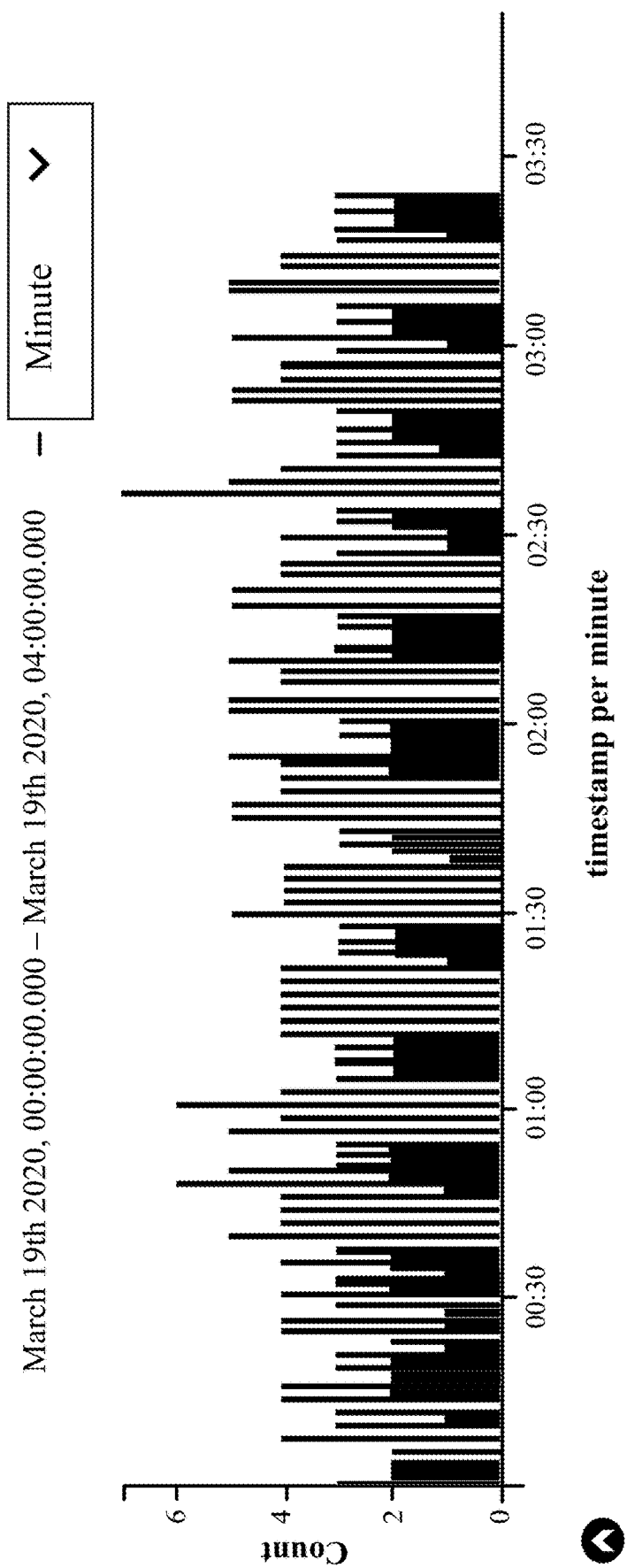
Figure 2A:
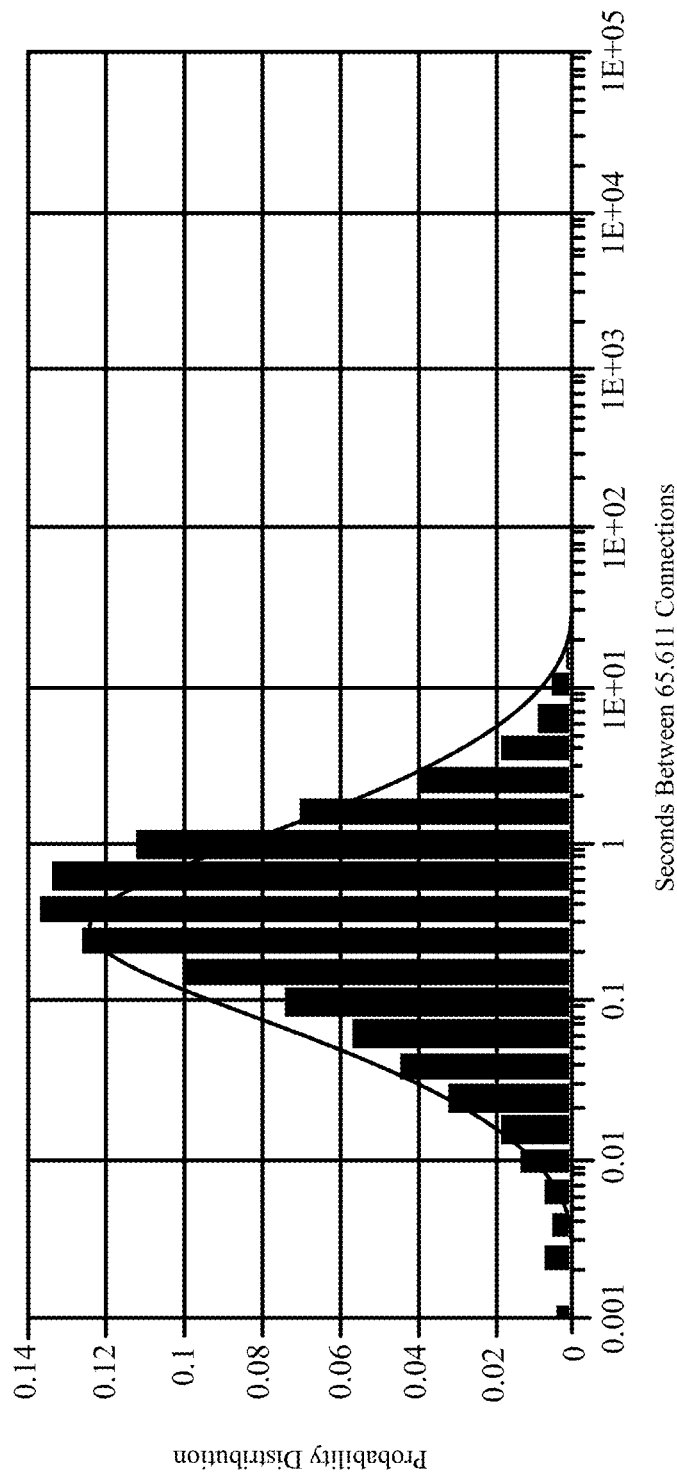
Figure 2A:
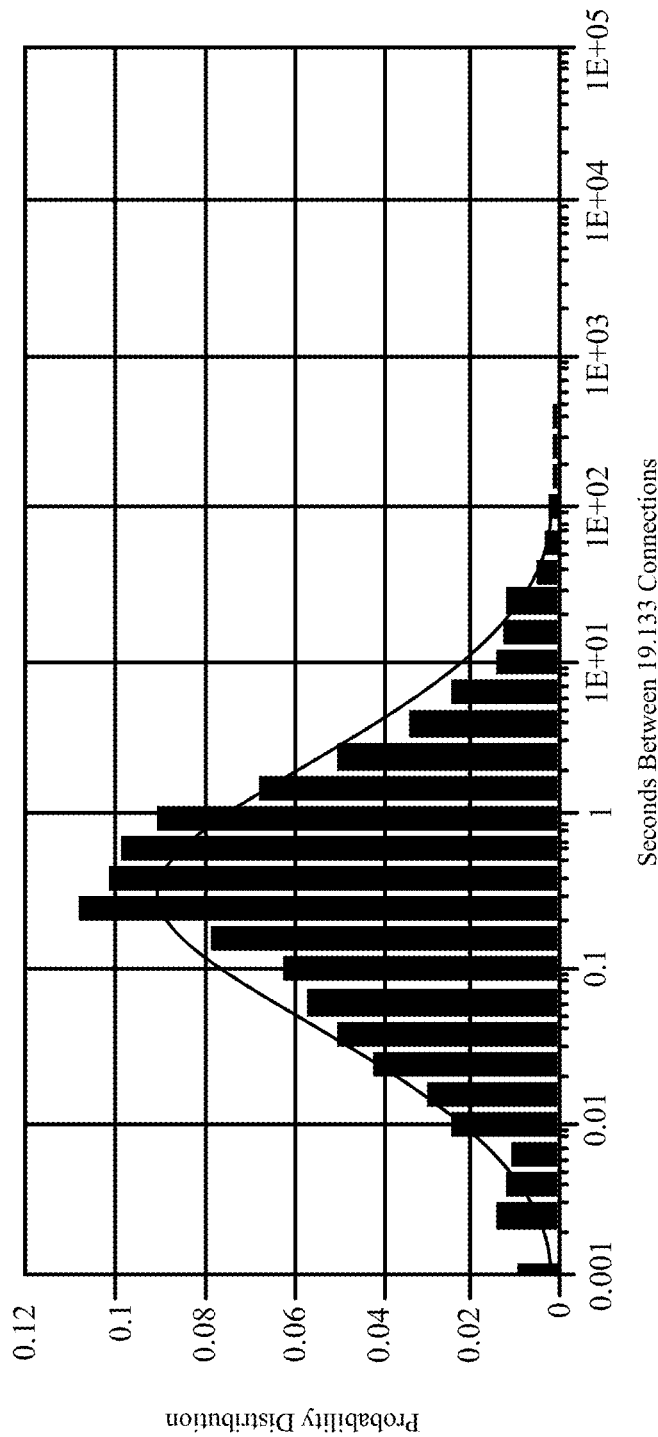
Figure 2A:
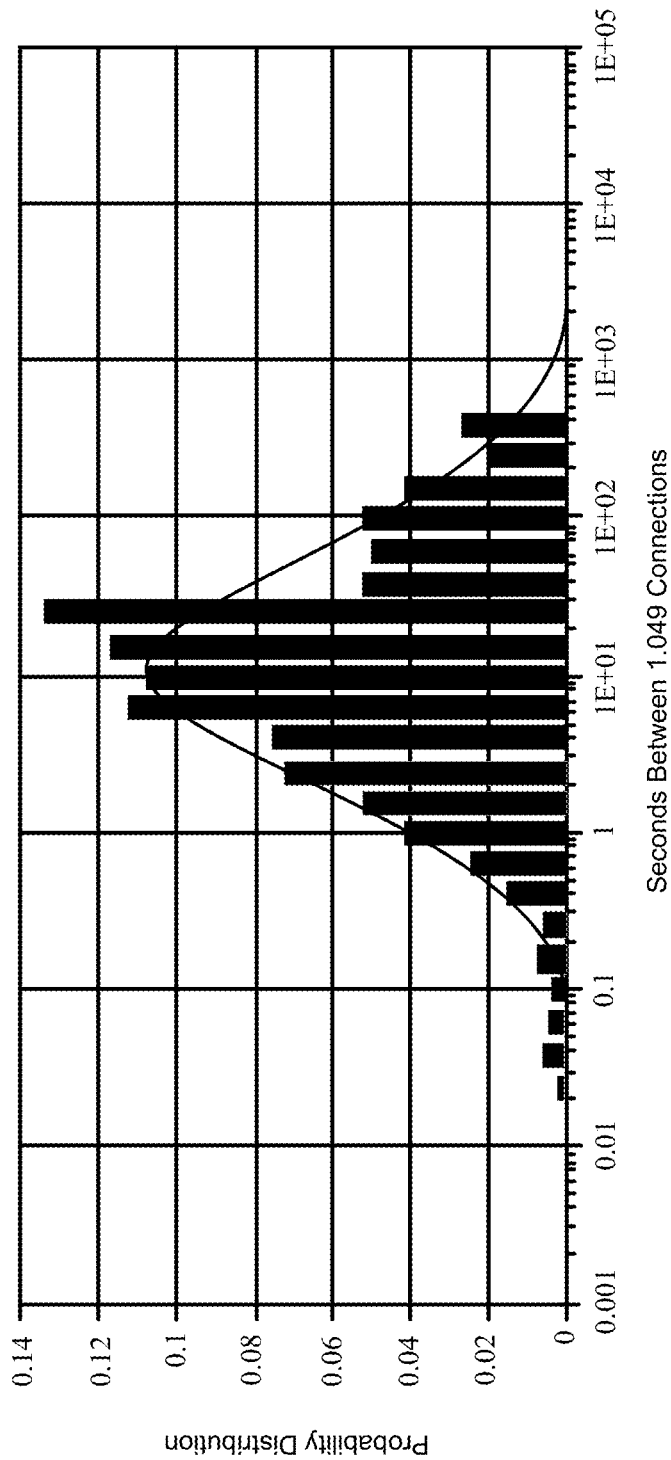
Figure 2A:
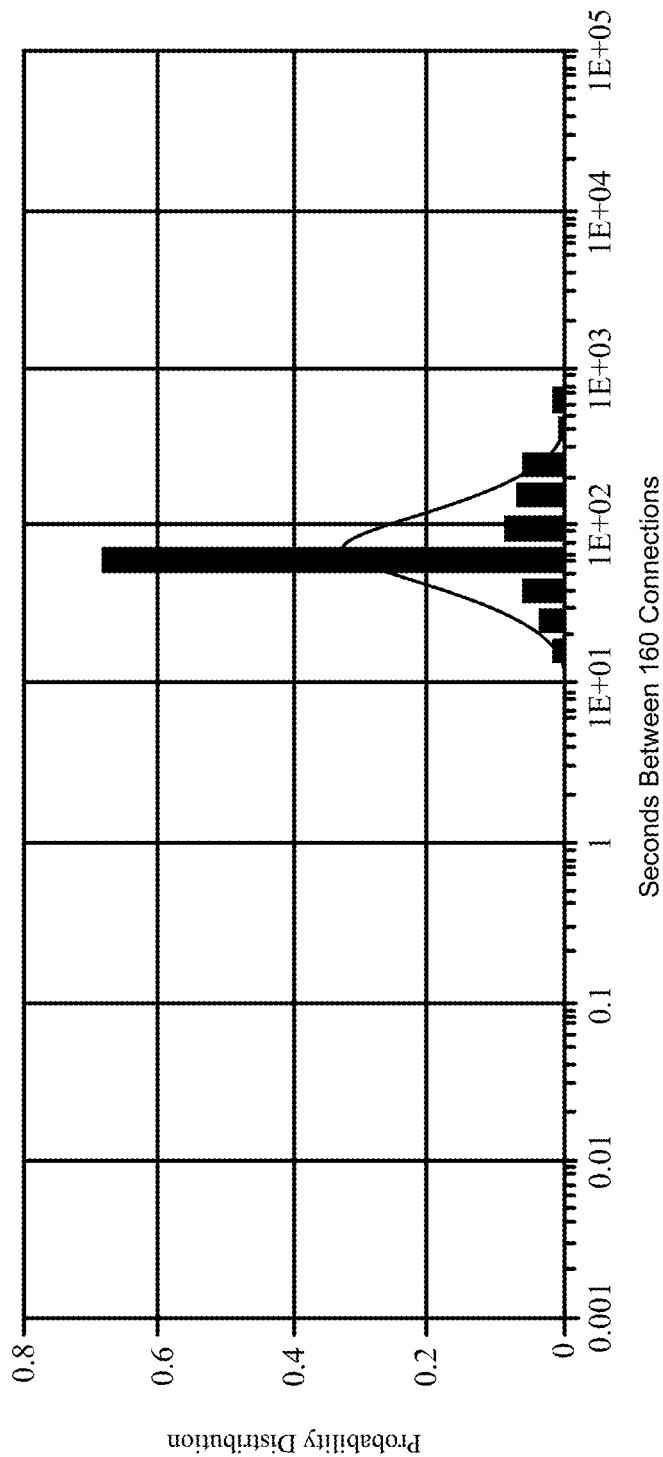
Figure 2A:
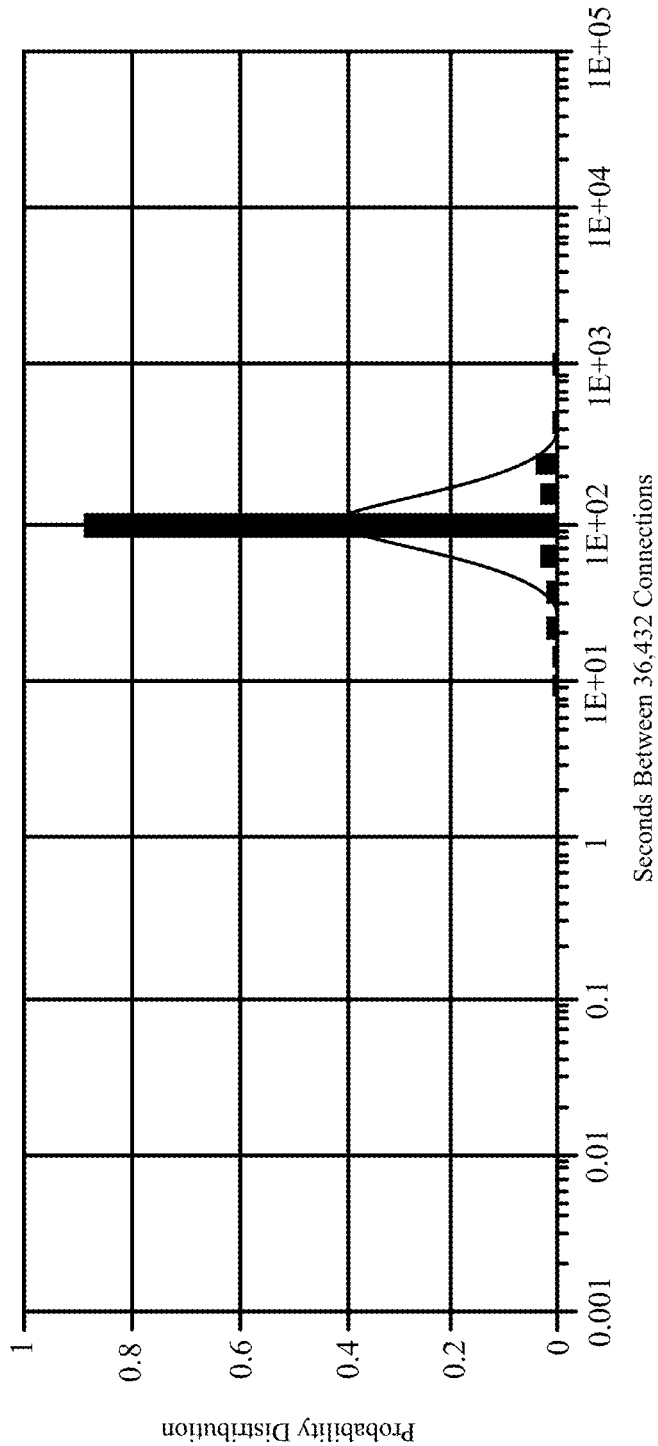
Figure 2A:
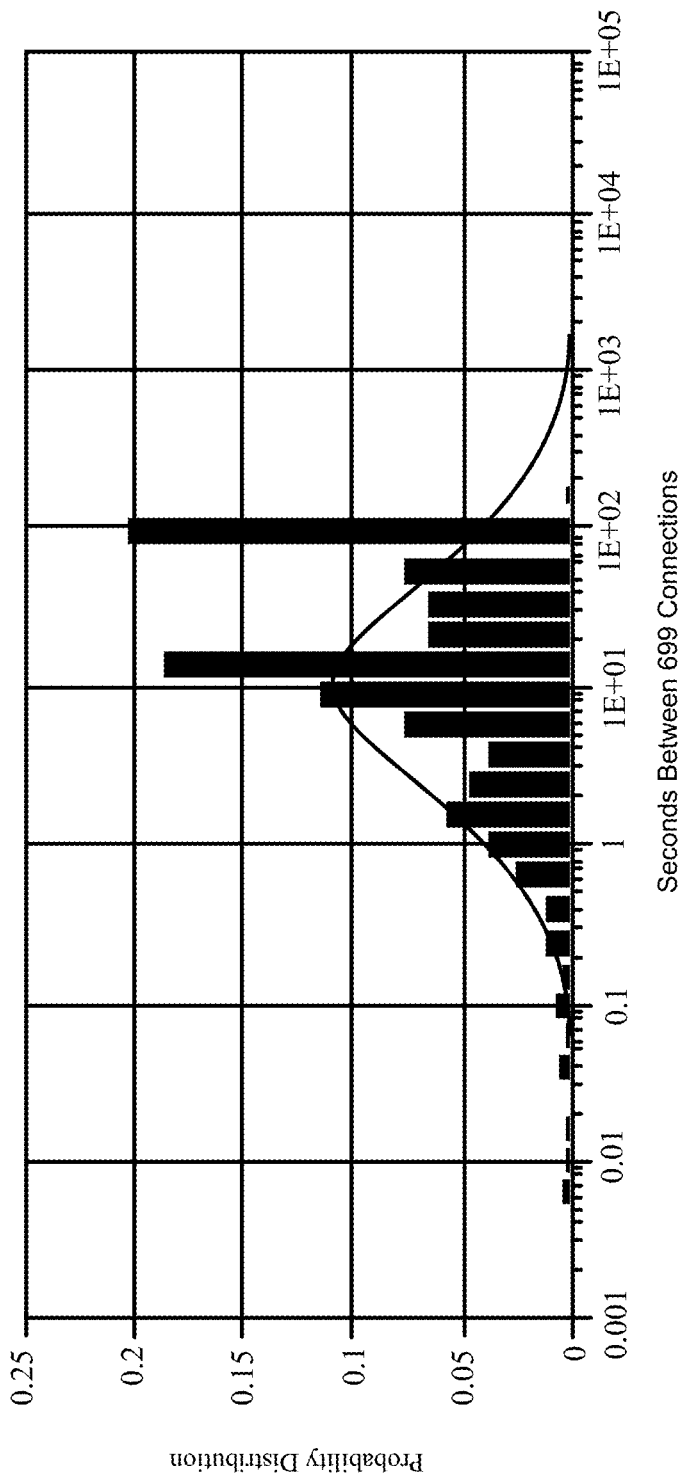
Figure 2A:
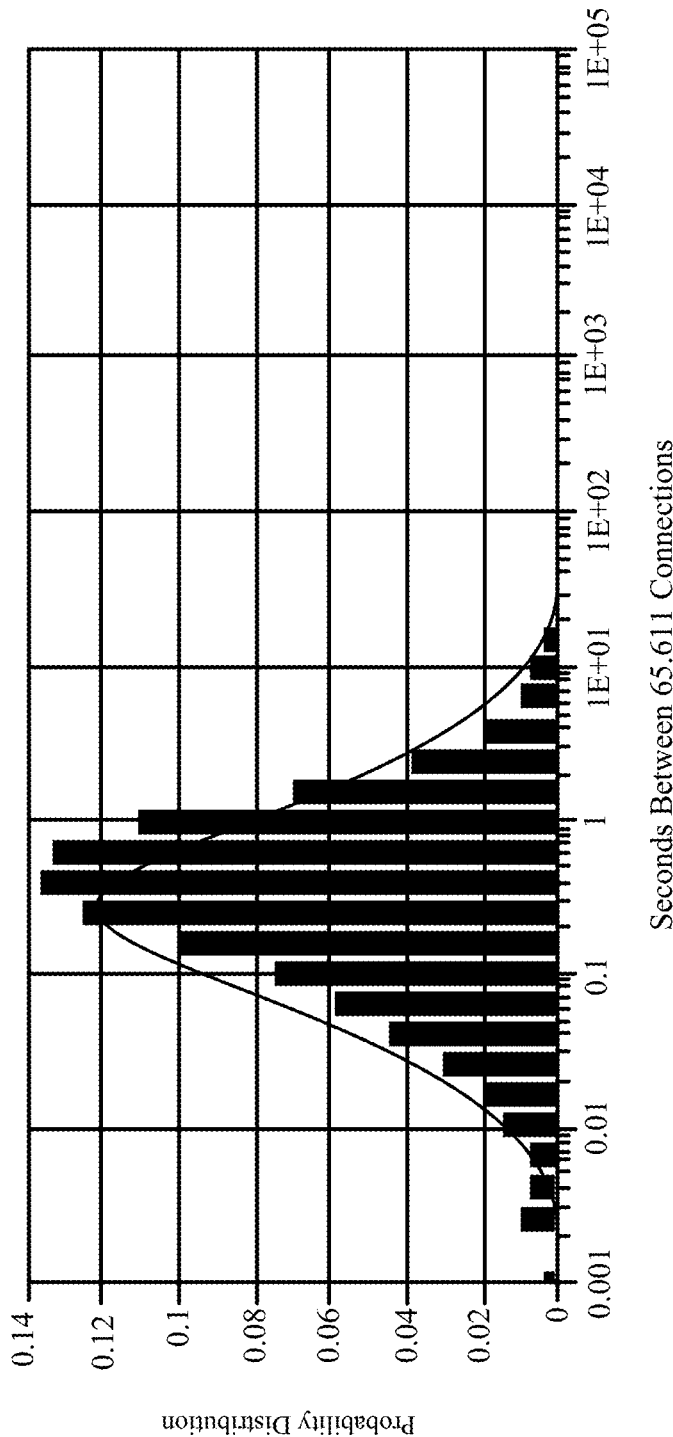
Figure 2A:
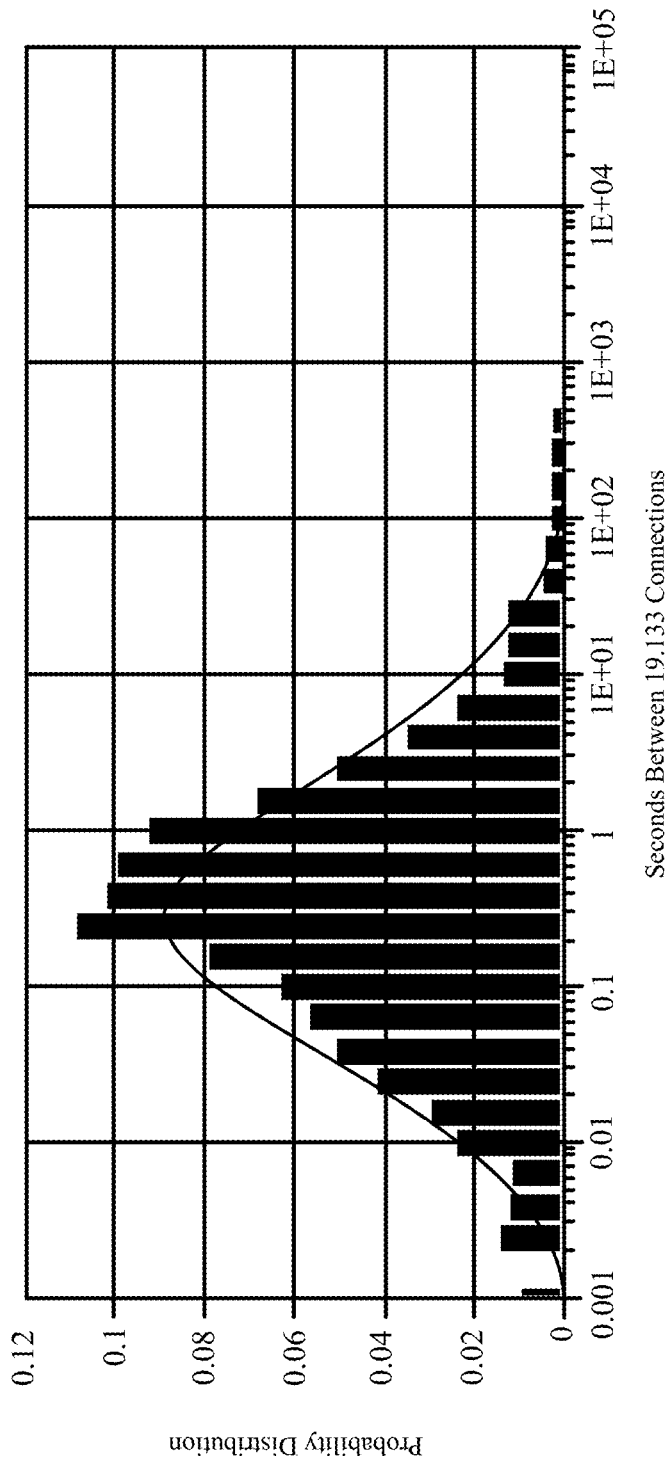
Figure 2A:
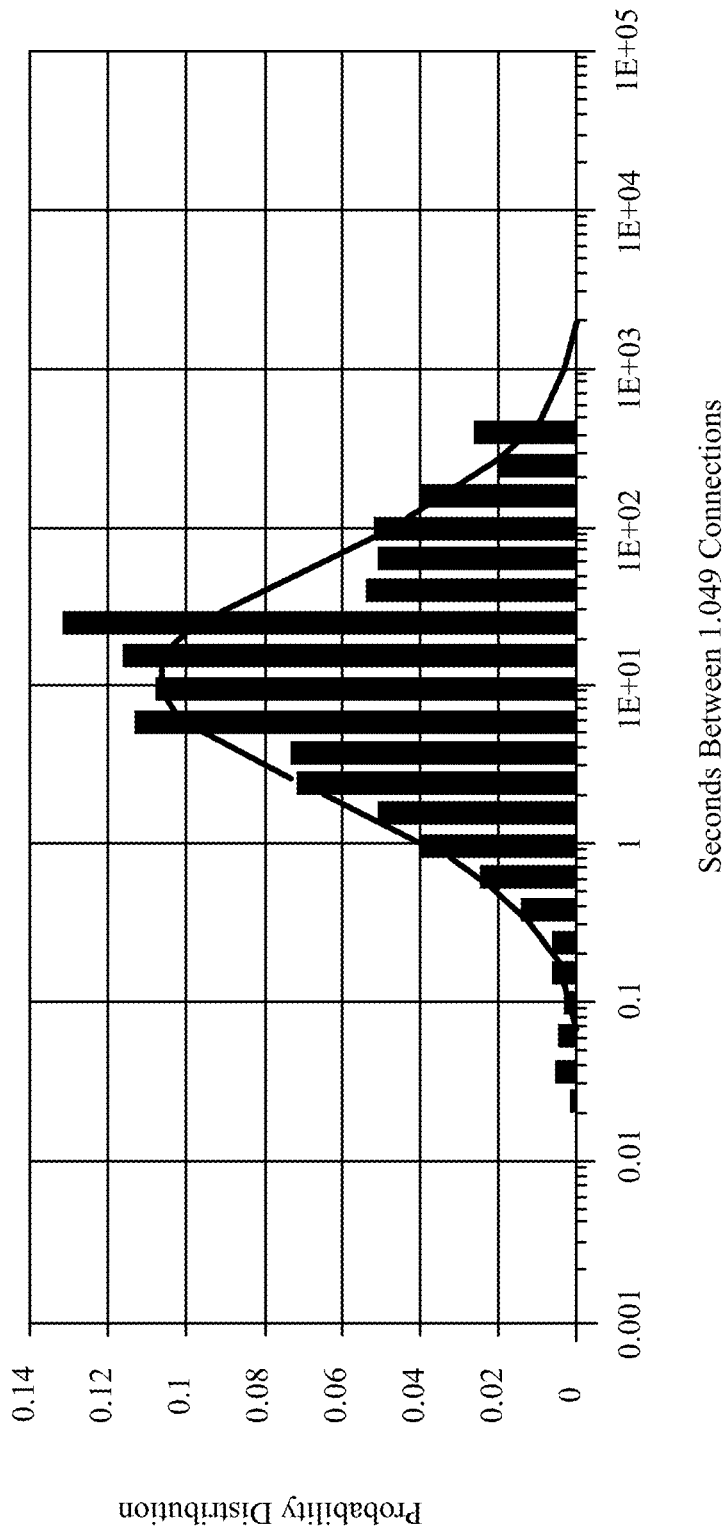
Figure 2A:
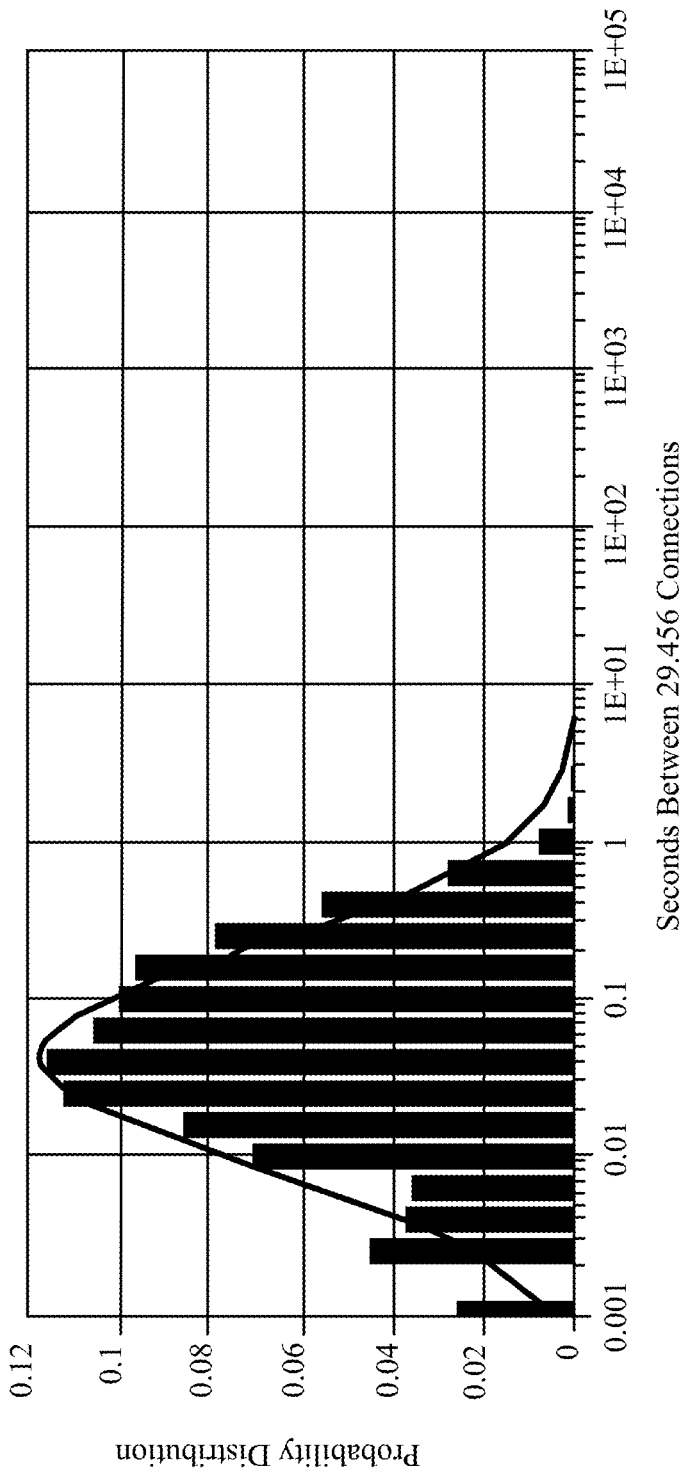
Figure 2A:
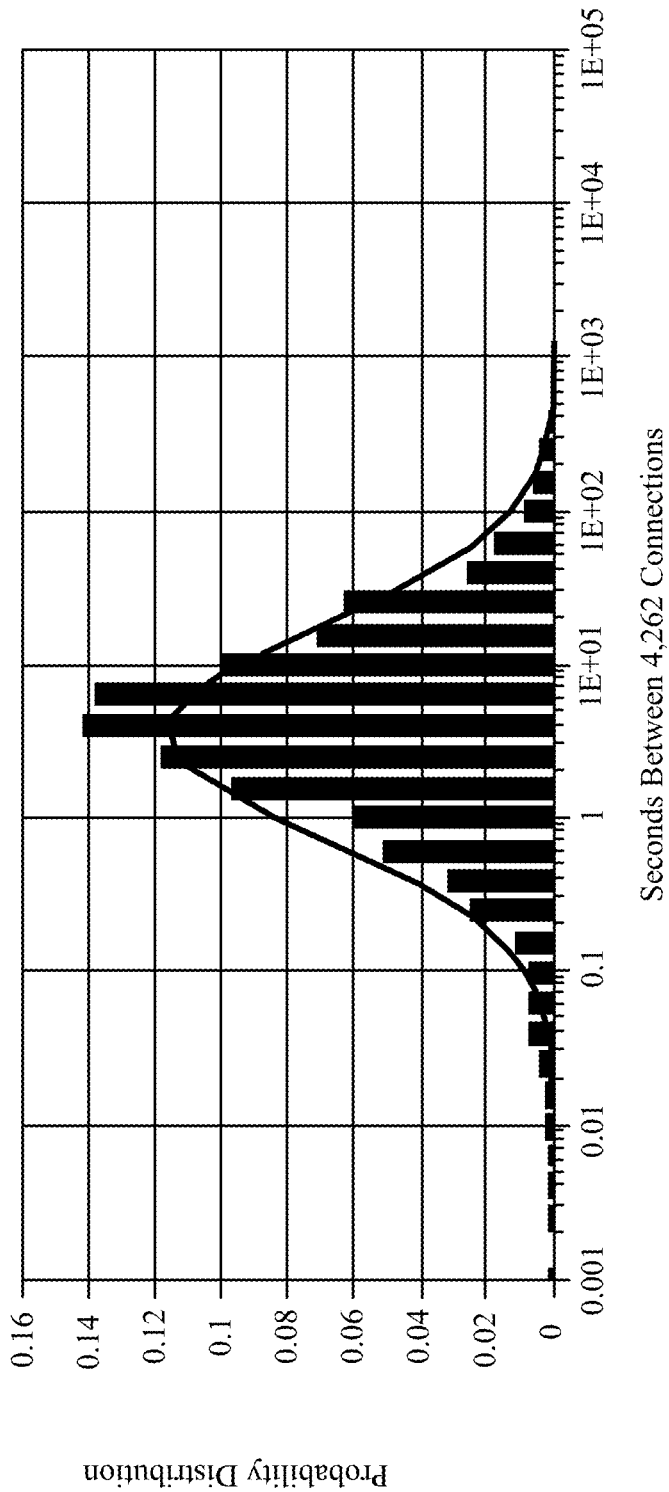
Figure 2A:
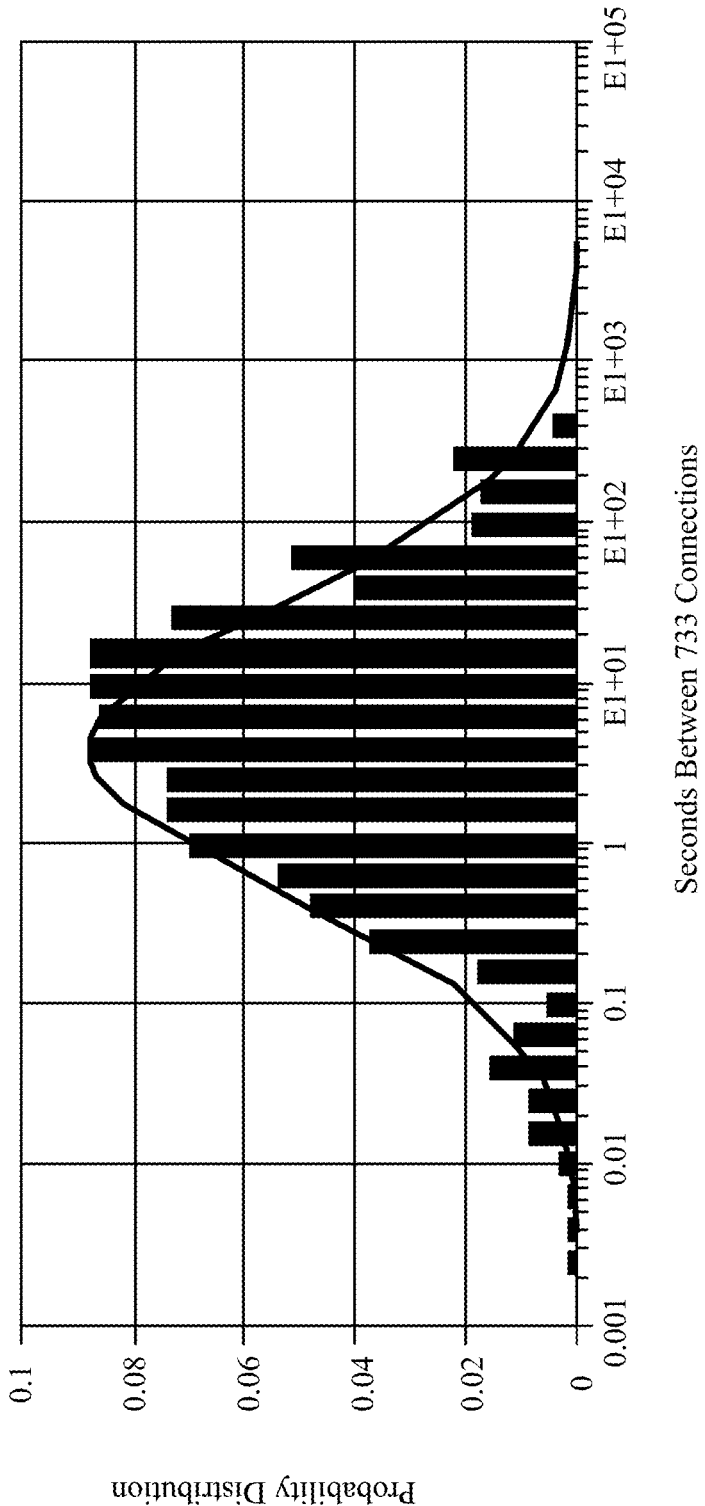
Figure 2A:
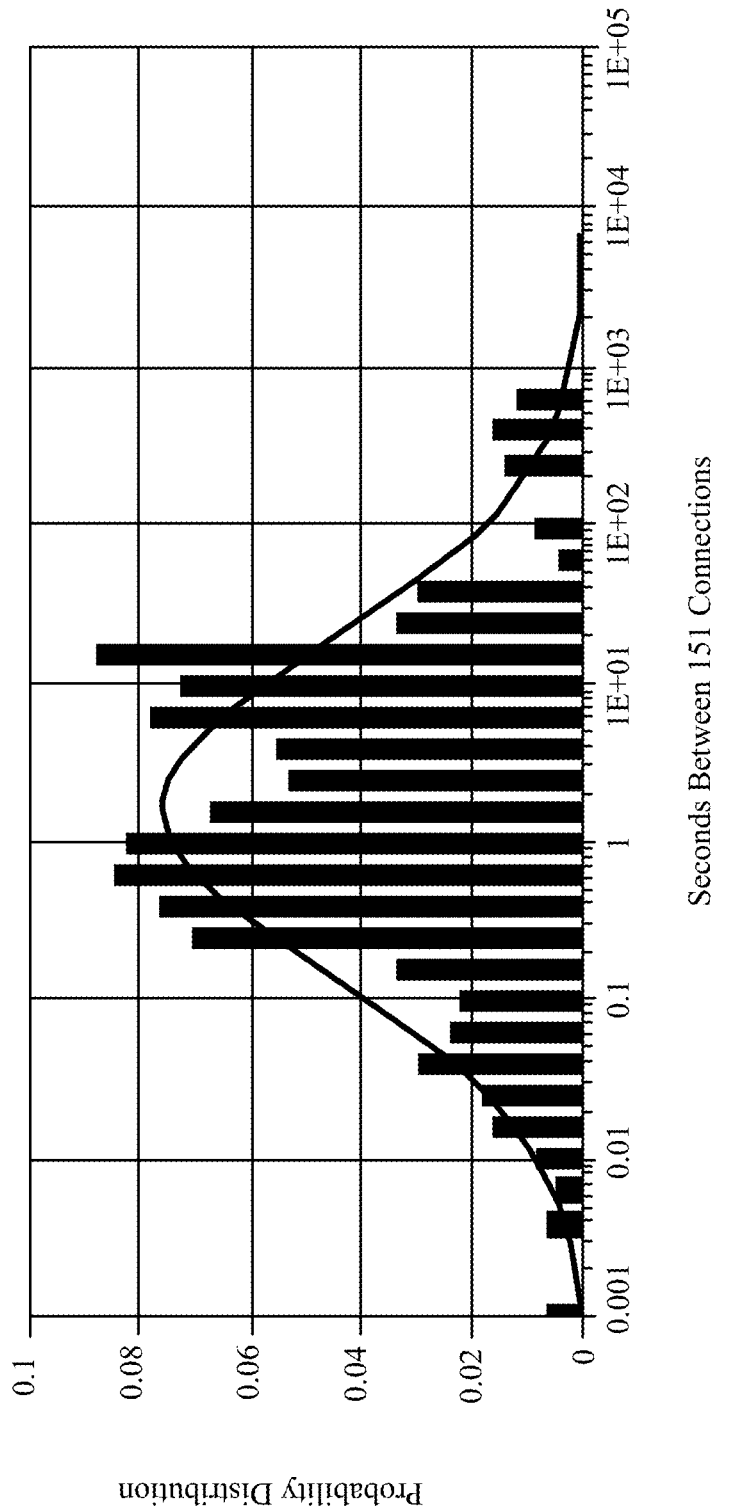
Figure 2A:
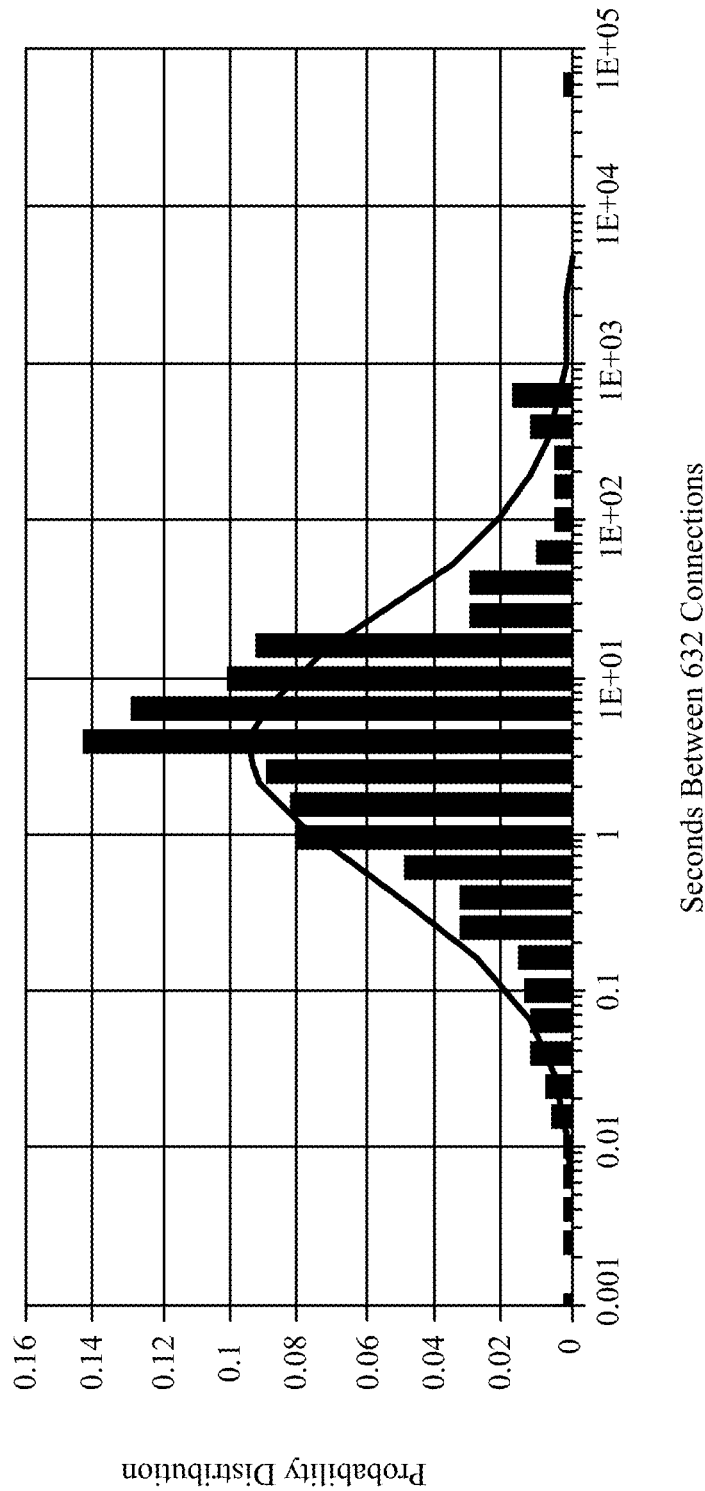
Figure 2A:
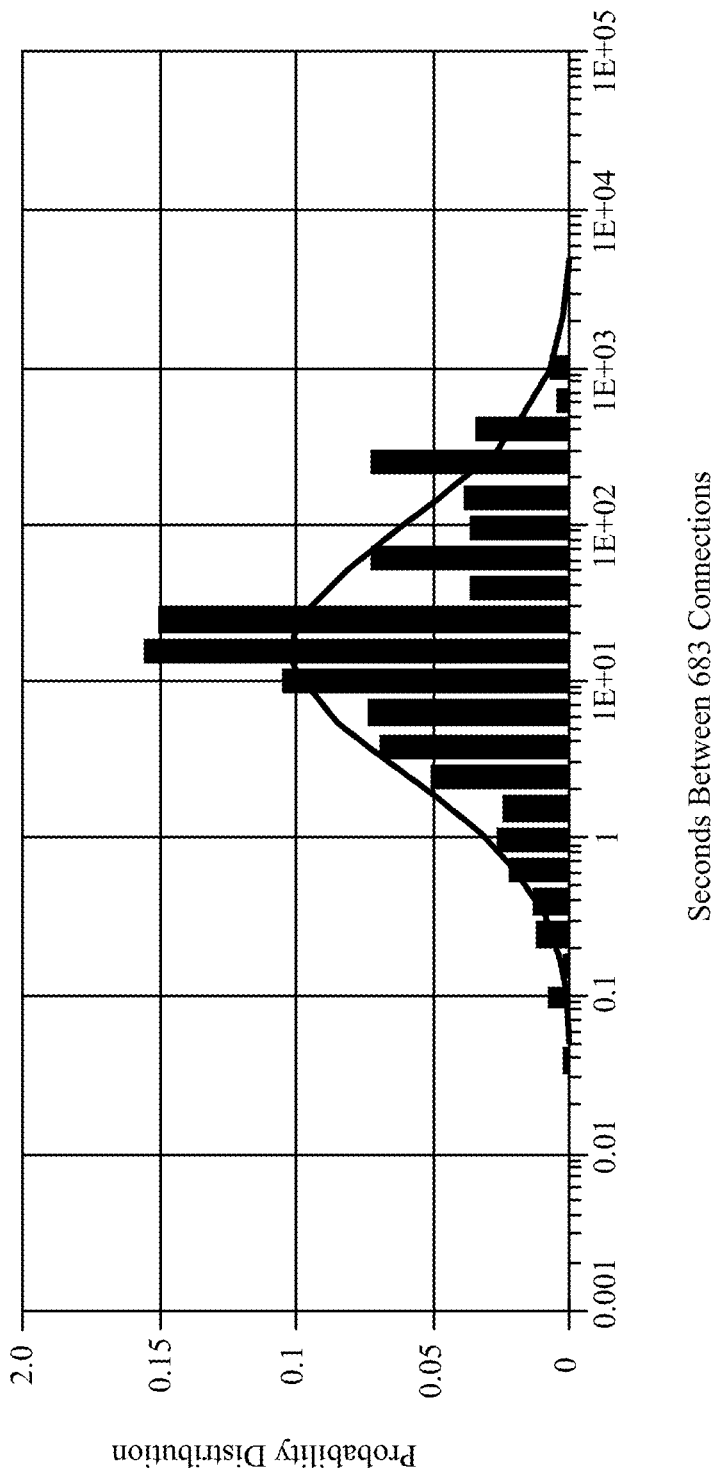
Figure 2A:
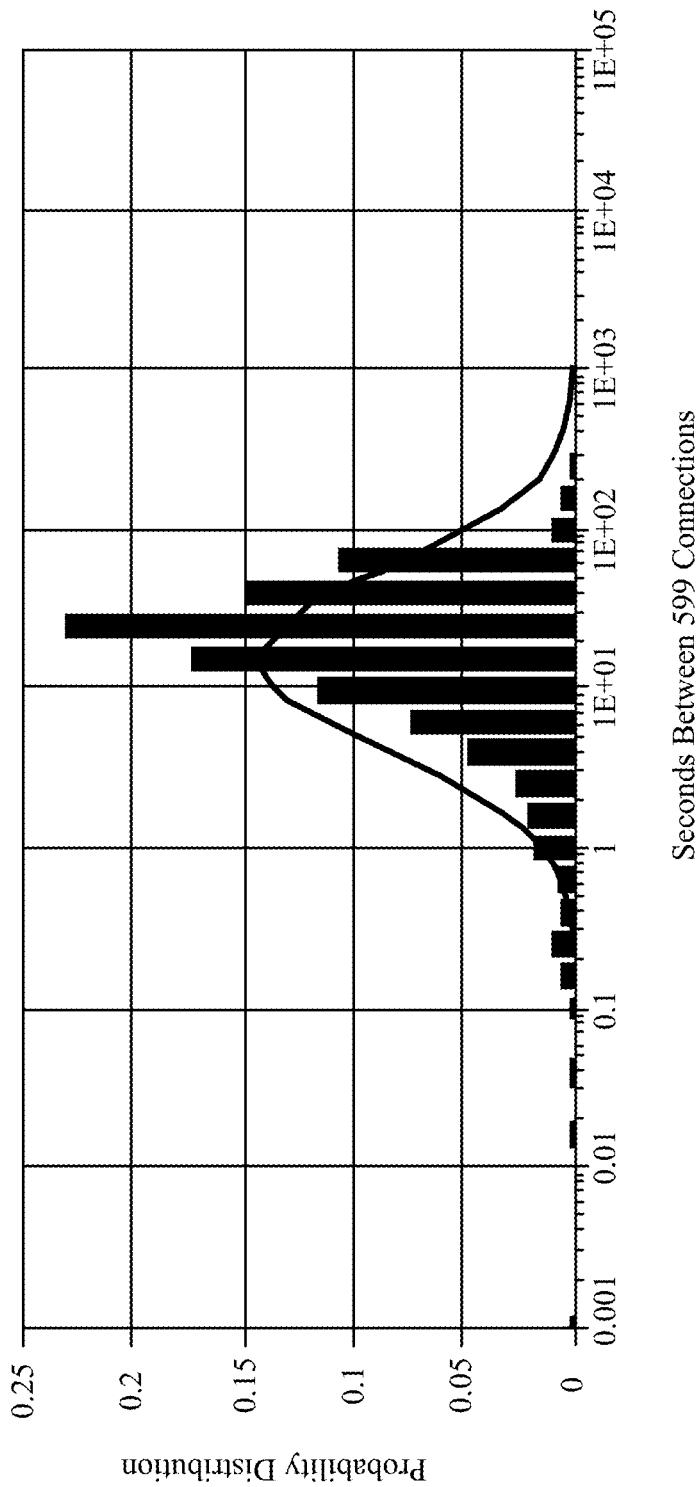
Figure 2A:
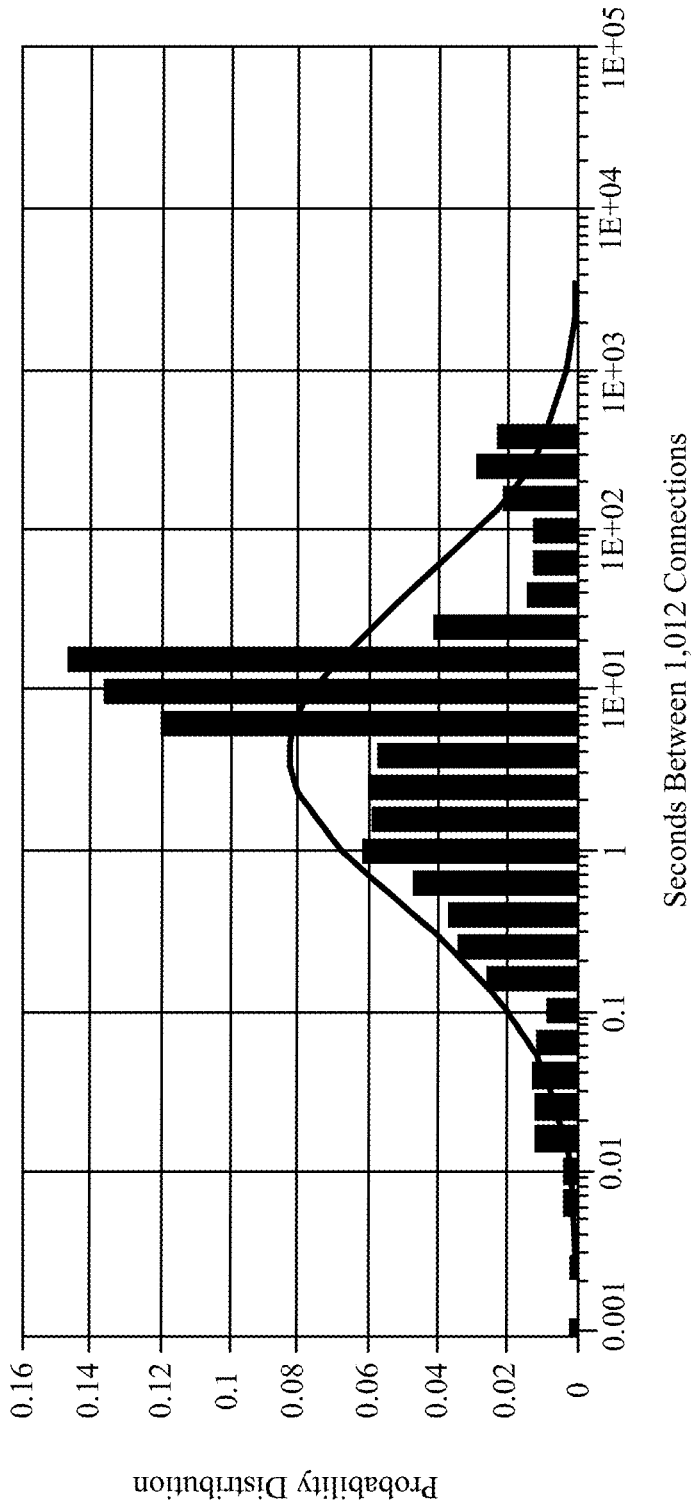
Figure 2A:
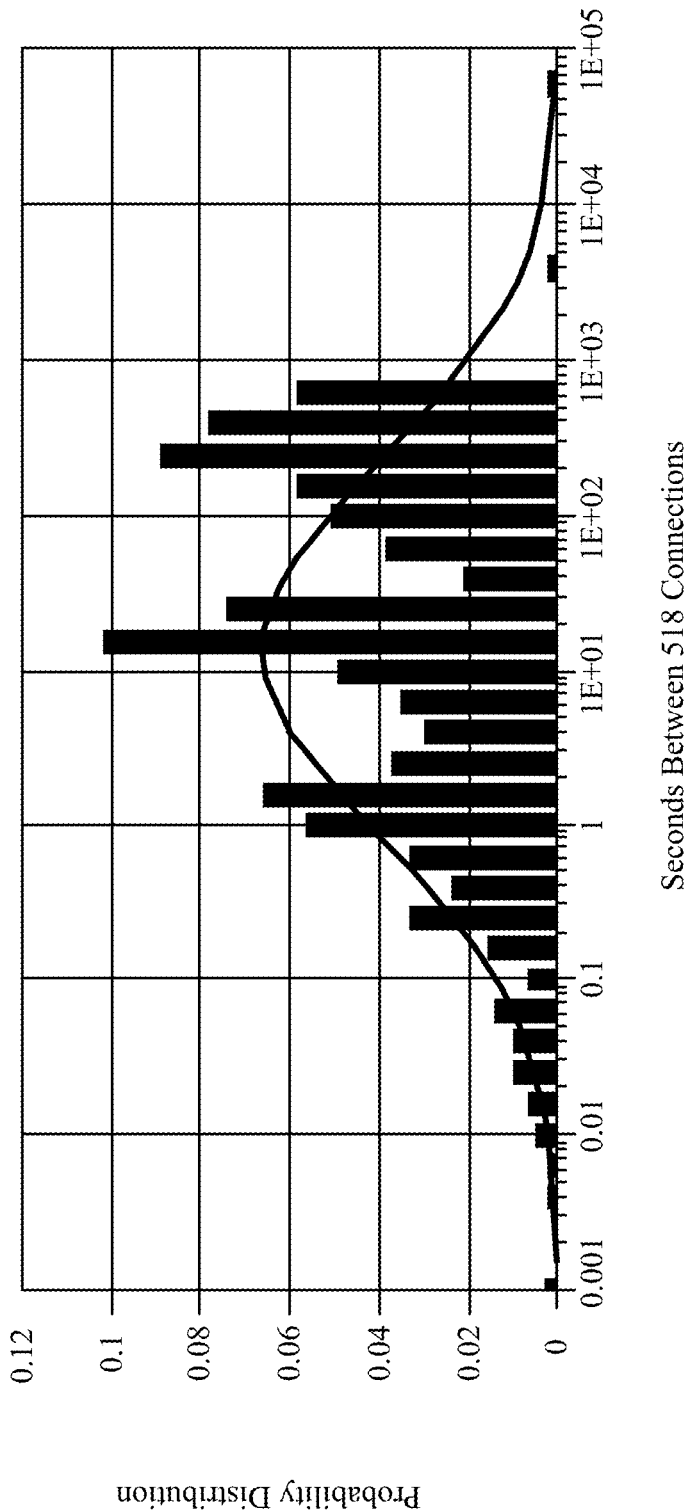

FIG. 2AA may display Graph 3 which displays the probability distribution of connection data with one second wide bins and a range of 0 to 10,000 seconds (about 2.8 hours).

There may be a problem with this representation. Even though the bot shown has a relatively slow beacon period of about once every 60 seconds, all the data is bunched up near the origin. And the system and method may be more useful if the right side of the graph was extended out even further to about one day. FIG. 2AB may display Graph 4 which illustrates the results of changing the X axis to a logarithmic scale.

The representation of the data may still be improved as the data is clumped together and there are many bins with only a single event.

FIG. 2AC may display Graph 5 which illustrates what happens when the period of the beacon is changed to be between two and six seconds using this representation. The result is that the data is spread out too much.

The problem is that the system and method could produce a more useful result if the bins got wider as the period between connections gets longer. At a period of 10 seconds, the one second bins represent 10% of the period. At one hour, a one second bin represents 0.0278% of the period. Thus, the system and method may need bin sizes that increase with the size of the time spans.

At block 230, a bin width may be determined. The bin width may be determined by taking a logarithm of a predetermined base of a time span and multiplying the bin width by a number of desired bins for each 10 fold increase in timestamp interval. The time span may be the time between each successive connection between the two computers. In one embodiment, a beginning time span may be one millisecond. Further, in additional embodiments, three to ten bins may be created per each 10 fold increase in time stamp interval of the communications from a first computer to a second computer through a network.

In one embodiment, the predetermined base is in the range of 9-11. The system and method may start with a base of 10, evaluate the results, and adjust the logarithm base to see if the new base creates an improved result.

At block 240, a bin number may be determined for a given time span. The bin number may be determined in a number of ways. In one embodiment, the bin number may be determined by taking the logarithm of a predetermined base of the time span to determine a time result, multiplying the time result by the number of desired bins for each 10 fold increase in time span interval to determine a bin result.

At block 250, the integer portion of the bin result may be used as the bin number. Time spans that result in the same integer value may fall into the same bin and may provide the increased bin size as the timespan increases. In one embodiment and not limitation, the system and method may use five bins per each 10-fold increase in timestamp interval. The resulting graph may have enough resolution to call out the approximate period of the beaconing and large enough to get multiple events per bin for relatively small samples of connection data.

One more heuristic that may be used in the binning of the timestamp interval data is that there may be useful data features at time span resolutions less than one second. One millisecond "ticks" (the smallest resolution of time) may be used with good results. When displaying increasing width bins, the use of a log scaled axis may transform the width of the bins into equal visual size on the graph. The system and method may create graphs using a log base 10× axis to deal with the wide range of time spans as well as the wide range of bin widths. The result of the log based approach is shown in FIG. 2AD/Graph 6. The underlying data may be the same data as shown in FIG. 2AA/Graphs 3 and FIG. 2AB/Graph 4.

These variable size bins may result in other benefits in addition to better visuals:
Reduced computation time because of the fewer bins;
Reduced memory requirements because of the fewer bins; and
Because the bins with content are not as sparse, fewer connections are required for the statistics to work.

Hunting for bot 150 beaconing behavior may be about finding specific types of traffic between two computers. This abnormal traffic, as seen in the heuristics or linear time based approaches used by other attempted solutions to this problem, may be frequent connections with the time spans between the connections being similar. A "pure" beacon or bot 150 may connect with an exactly one-minute (or perhaps 10, 90, or 120 seconds) time span between connections.

FIG. 2AD/Graph 6 and FIG. 2AE/Graph 7 illustrate nearly pure beacons in a network discovered by the system and method. In FIG. 2AD/Graph 6, 68% of the time spans between connections are in the bin corresponding to 60 seconds. FIG. 2AE/Graph 7 illustrate the most frequent beacon time span is in the bin corresponding to 100 seconds with 88% of all connections falling into this bin.

FIG. 2AF/Graph 8 may be for the same bot data shown in FIG. 2AE/Graph 7.

The transformation of the beaconing data from a time base to a probability distribution may make the detection much easier. In a timeline view, the system and method may be looking for uniformity. Using the probability approach of the disclosed system and method, the visual peak may be easier to spot with just 160 connections instead of the thousands usually desired even with nearly pure beaconing behavior. Give enough data, such pure behavior may be easy to find with the commonly used heuristic measurements. However, the bot makers may change the time spans to make such detection difficult or impossible. A simple change may be to make the time span a random number between 60 seconds and 120 seconds or changing between two different time spans. A more difficult bot 150 to find is shown in FIG. 2AG/Graph 9. The predominate peaks are at about 15 and 100 seconds.

Compare the graph of the system and method to a linear time based graph of the same data in FIG. 2AH/Graph 10.

It takes a far more skilled and imaginative analysis to conclude FIG. 2AH/Graph 10 represents beaconing behavior. And the automated detection of this is extremely problematic without transforming the data as the system and method has done.

The transformation of timestamp intervals into discrete probability distributions with increasing bin sizes in graphical form makes the analysis easier. More importantly, the transformation makes the mathematical analysis easier which saves memory, computing cycles and power.

As mentioned earlier, most bot communication may differ, in measurable ways, from "normal" computer communication. Measuring the distance between the pattern of actual traffic observed and a normal traffic pattern may provide a number to rank the suspiciousness of a given set of connections between two computers. By looking for deviations from "normal" traffic instead of features known to exist in previously analyzed bots, the system and method may make the deception task of the bot maker much more difficult. Bot makers do not have to just change the beaconing behavior, they must make the behavior look like "normal" network traffic.

At block 260, the bins may be analyzed. The analysis may take a variety of forms. In one embodiment, a normal/Gaussian distribution for the plurality of the bins may be created. In order to detect deviation from "normal" traffic, the system and method may need to know what normal is. The assumption may be made that traffic between most computers has a great deal of randomness in the time spans between connections. The randomness may come from various sources. Network traffic congestion may add randomness. Data buffers may fill up at different intervals because data sources are based on human interaction or, in the case of some clients, cell phone usage, depending on the business. With multiple sources of randomness affecting the time between connections, the Central Limit Theorem dictates that the system and method may be able to model "normal" traffic as a Gaussian distribution. Because the Gaussian distribution is so frequently encountered it is also called, not surprisingly, a normal distribution and is commonly known as the "bell curve."

The randomness may not always dominate and may not even be present in some cases. There may be benign bot behaviors built into many software products. The classic examples may be the check for the current time in Windows machines every 30 seconds, checking for new email, and checking for updates to the operating system or an application on a less frequent basis. These cases will fool any automated detection system which is ignorant of benign beaconing behavior and the analysis may need to be aware before "sounding the alarm" on beaconing behavior.

A review of traffic between computers while ignoring benign beacons may demonstrate that typical traffic does tends to approach a Gaussian probability density function. Examples are shown in FIG. 2AI/Graph 11, FIG. 2AJ/Graph 12, and FIG. 2AK/Graph 13 with a Gaussian probability density function overlaying the actual connection data.

There does not appear to be significant deviations from network traffic to a normal distribution for most pairs of computers if the number of connections is relatively large.

The Gaussian curves shown and FIG. 2AI/Graph 11, FIG. 2AJ/Graph 12 and FIG. 2AK/Graph 13 were created by computing the mean and standard deviation of the mean values and counts of each bin. That is, if the contents of bin 25 has a mean value of 25.2 and 100 events in that bin, then 100 events of value 25.2 are added to the computation of the mean and standard deviation. The resultant mean and standard deviation may then be used to create the Gaussian curve of the Normal Model.

For very 'pure' bots, the Normal Model may begin to approximate the actual bot 150 traffic and this situation may result in a special case where the above process may be appended. If the standard deviation is less than 1.2 bins, the standard deviation may be increased such that the Bot Score is guaranteed to be greater than or equal to a Bot Score floor of 50. The number 50 was chosen as this number or score (the Bot Score), somewhat arbitrarily, and may be a floor to indicate "Beaconing" behavior. Logically, the Bot Score floor may be adjusted according to the desires of the system and method. A network connection data set with a standard deviation of less than 1.2 bins may qualify as beaconing, and the resultant bot score may reflect the bot behavior determination. This approach may also cover the case where the timestamp intervals are so uniform that the standard deviation, in bins, approaches or becomes zero. A standard deviation approaching zero may cause problems in the mathematics used.

As part of the analysis at block 260, a normal/Gaussian distribution for the plurality of the bins may be created. At block 270, the set of connections between any two computers on a network may be compared to a Gaussian curve to see how closely it matches. The more closely the connection matches the Gaussian curve, the less likely it is abnormal.

Using probability theory, the first thing which may come to mind is the chi-squared test. This test may be used to compute the probability a deviation from an expected probability distribution is due to chance. While the chi-squared test is related to the bot 150 seeking task, it is significantly different and the test may not provide useful results.

It is likely the distribution may not be truly Gaussian. The system and method are not interested in the probability of the connections not matching a Gaussian distribution. The system and method may be interested in how different a connection set may be from a Gaussian curve.

The system and method may use a modified version of the chi-squared test to compute a score for the set of connections between a suspected bot and command and control server: Below is sample pseudo code to compute a score for the set of connections between a suspected bot and command and control server.

```
double sum = 0.0;
foreach (ProbabilityDistributionBin bin in setOfBins)
{
    // The expected probability, ep, of a value falling in bin b
    // is computed from normal model Gaussian probability density.
    double ep = AreaOfNormalModelAtBin(bin);
    // Compute the expected number of events.
    double ee = ep x TotalNumberOfEvents;
    // Ignore bins when the expected number of events is less than
    // five or represent connections less than two seconds apart.
```

```
    if (ee < 5 OR TimeStampInterval(bin) < 2)
    {
        continue;
    }
    // The expected probability of a bin is subtracted from the
    // observed probability of the bin.
    double delta = ObservedProbability(bin) - ep;
    sum += (delta x delta) / ep;
}
double botScore = 100.0 x sum;
```

Many different metrics may be used in different embodiments. In some embodiments, the mean squared error from the Gaussian curve may be used. In other embodiments, the absolute value of the mean error from the Gaussian curve may be used. In yet additional embodiments, some minimum threshold of deviation from the Gaussian probability at one or more bin locations may also be used to indicate various levels of suspicion. In yet another embodiment, the maximum deviation from the Gaussian probability may be used. And in some additional embodiments, the modified chi-squared test presented above may provide better results than any of the other embodiments.

Figure 3:
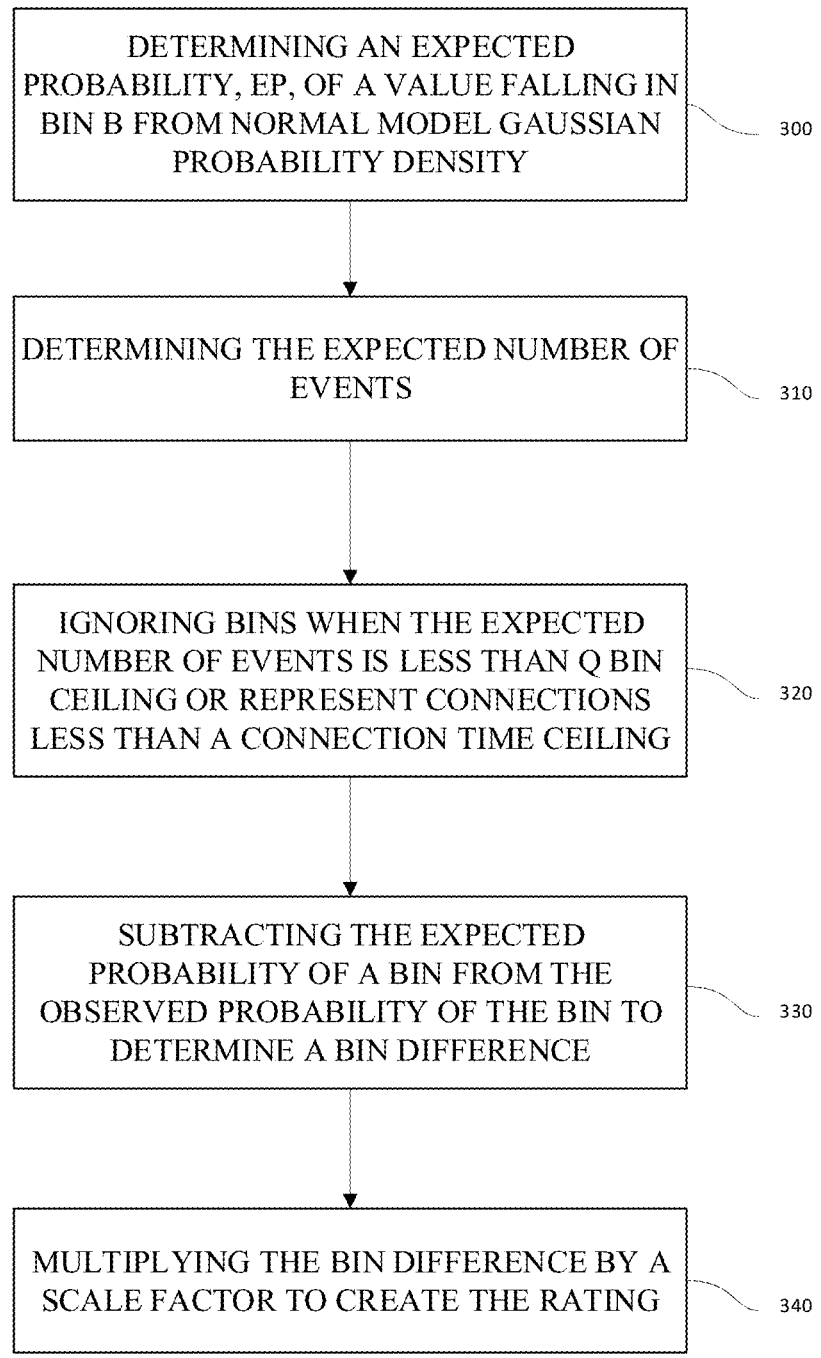
FIG. 3 illustrates a method of creating analysis bins.

In one embodiment, the analysis to create the Bot Rating may include blocks as illustrated in FIG. 3. At block 300, an expected probability, ep, of a value falling in bin b from normal model Gaussian probability density may be determined. At block 310, an expected number of events may be determined. At block 320, bins may be ignored when the expected number of events is less than q bin ceiling or represent connections less than a connection time ceiling which may be two seconds apart. Of course the connection time ceiling may vary such as by plus or minus some seconds, such as 3 seconds, The bin ceiling may be in a range of 5+ or −1. At block 330, the expected probability of a bin may be subtracted from the observed probability of the bin to determine a bin difference.

At block 340, the bin difference may be multiplied by a scale factor to create the rating. The rating may be determined in a variety of ways. The rating may indicate the lack of similarity to Gaussian distribution and more likely bot 150 behavior. In one embodiment, value may be an absolute value of the mean error from the Gaussian curve. In another embodiment, the value may represent a minimum threshold of deviation from the Gaussian probability at one or more bin locations that may also be used to indicate various levels of suspicion. In yet another embodiment, the value may represent a maximum deviation from the Gaussian probability a mean squared error from the Gaussian curve.

Referring to FIG. 2 again, at block 280, a rating may be determined where the rating indicates the lack of similarity to Gaussian distribution and more likely bot behavior. As seen in FIG. 3, the system and method may display the Bot Score as well as other information of potential use to the analyst or system or method. It should be noted that output from the RITA (Real Intelligence Threat Analysis) algorithm is listed. RITA may be an Open Source network traffic analysis algorithm available through GitHub, for example. RITA may use median deviation, connections per unit time, and Bowley's measure of skew for scoring of both the beacon timing and the packet sizes.

Bot Score: 95.5
Score Meaning: Beaconing
Peak Probability: 0.877
Peak Mean: 105.7
Normal Model Mean: 25.09 (104.197 Seconds)
Standard Deviation 0.959
RITA Timestamp Score: 0.588
RITA Timestamp Mean: 114.408
Seconds Standard Dev. 89.041

The user interface may also display:
a. The meaning of the score. This may be a judgement call, but it may provide a clue to the novice analyst or provide a minimum guidance to the system or method. There may be four different possibilities:
  i. Benign
    (a Bot Score of less than 10);
  ii. Somewhat Suspicious
    (greater than or equal to 10 and less than 20);
  iii. Highly Suspicious
    (greater than or equal to 20 and less than 50); and
  iv. Beaconing
    (greater than or equal to 50).
b. The probability of the peak bin;
c. The mean value, in seconds, of the events which are contained in the peak bin;
d. The mean value of the Normal Model in bin number and in seconds;
e. The standard deviation of the Normal Model in bins;
f. The timestamp interval score given by the algorithm used by RITA;
g. The mean value of all the timestamp intervals as computed by RITA[1].

[1] The mean value computed by RITA differs from the mean value of the normal model because of the way they are computed. The RITA mean value is based on almost (timestamps intervals greater than about 1E5 seconds are ignored in our implementation) all the individual connection events. The normal model is computed from the mean bin values which is a log transformation from the seconds between connections. To compute the number of seconds from this mean the inverse transform is applied to the mean. The transformation into bin values greatly reduces the impact of extreme values which are not reduced when the RITA algorithm is applied to the untransformed data.

h. The standard deviation of all the timestamp intervals as computed by RITA.

At block 285, the system and method may determine if the Bot Score rating is over a threshold. At block 290, connections with ratings over a threshold for may be analyzed additional unauthorized bot 150 characteristics. For example, the IP address of the receiving computer may be obtained and compared to known computers to see if the receiving computer may be an unknown computer and more likely a bot.

The system and method may not claim the Bot Score represents a firm truth on the existence or nonexistence of a bot. It represents a probability and the communications may need to be investigated further. Benign bot behaviors may exist in network traffic. Some of these bot behaviors may be well known. Other bot behaviors may completely unknown to the analyst. Bot makers deliberately make their timestamp interval times difficult to distinguish from normal traffic.

The system and method may be able to create meaningful reports and determine a Bot Score with as few as 100 events. The low number of observations may be less than where the Central Limit Theorem claims validity. The Bot Score may be a good indicator and it is not a mathematical proof of correctness.

Each of the actual network communication data sets previously illustrated may be scored by the system and method and the timestamp interval categorization algorithm used by RITA. The RITA score may range from 0.0 to 1.0 with 1.0 being a perfect match with expected bot communication. The below graphs may include a RITA score, however, no packet data size was available, so this is somewhat unfair to RITA which places the same weight on the statistics of the packet sizes as it does on the timestamp interval information. The results were as follows in FIG. 2AL/Graph 14 with the Normal Model overlaying the Discrete Probability Distributions of the network traffic.

FIG. 2AL/Graph 14 may have a Bot Score of 66.5 and a RITA timestamp score of 0.488.

FIG. 2AM/Graph 15 may illustrate a Bot Score of 95.5 and a RITA timestamp score of 0.588.

FIG. 2AN/Graph 16 may illustrate a Bot Score of 54.5 and a RITA timestamp score of 0.308.

FIG. 2AO/Graph 17 may illustrate a Bot Score of 0.9 and a RITA timestamp score of 0.877.

FIG. 2AP/Graph 18 may illustrate a Bot Score of 0.9 and a RITA timestamp score of 0.830.

FIG. 2AQ/Graph 19 may illustrate a Bot Score of 4.9 and a RITA timestamp score of 0.498.

Previously the Bot Score meanings were described as:
Benign (a Bot Score of less than 10);
Somewhat Suspicious (greater than or equal to 10 and less than 20);
Highly Suspicious (greater than or equal to 20 and less than 50); and
Beaconing (greater than or equal to 50).

Below are examples of what such scores look like. Notice the gradual change from approximating a Gaussian curve to a pure beacon.

FIG. 2AR/Graph 20 may be the only data set which did not involve a destination IP which "was detected beaconing" by network security and/or categorized as "Recent C&C Server" or "Nameserver for C&C Server" in advance. It is believed these bots were created to deliberately create various levels of camouflage. FIG. AS/Graphs 21 through FIG. 2BA/FIG. 29 and FIG. 2BD/Graph 32 all used the same destination IP address.

Figure 2B:
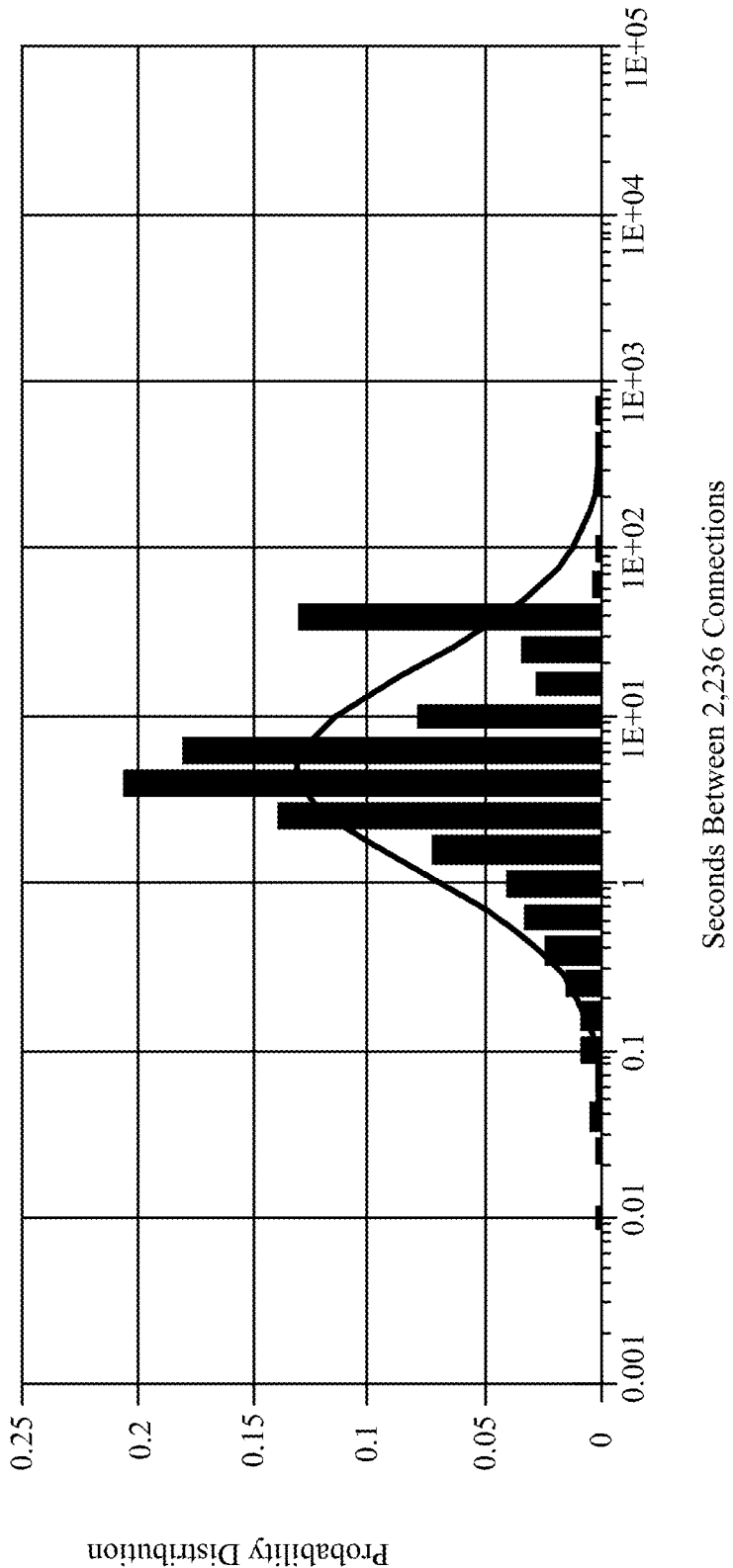
FIG. 2BA may display Graph 29 which may illustrate a bot score of 35.7 and a RITA timestamp score of 0.809.
Figure 2B:
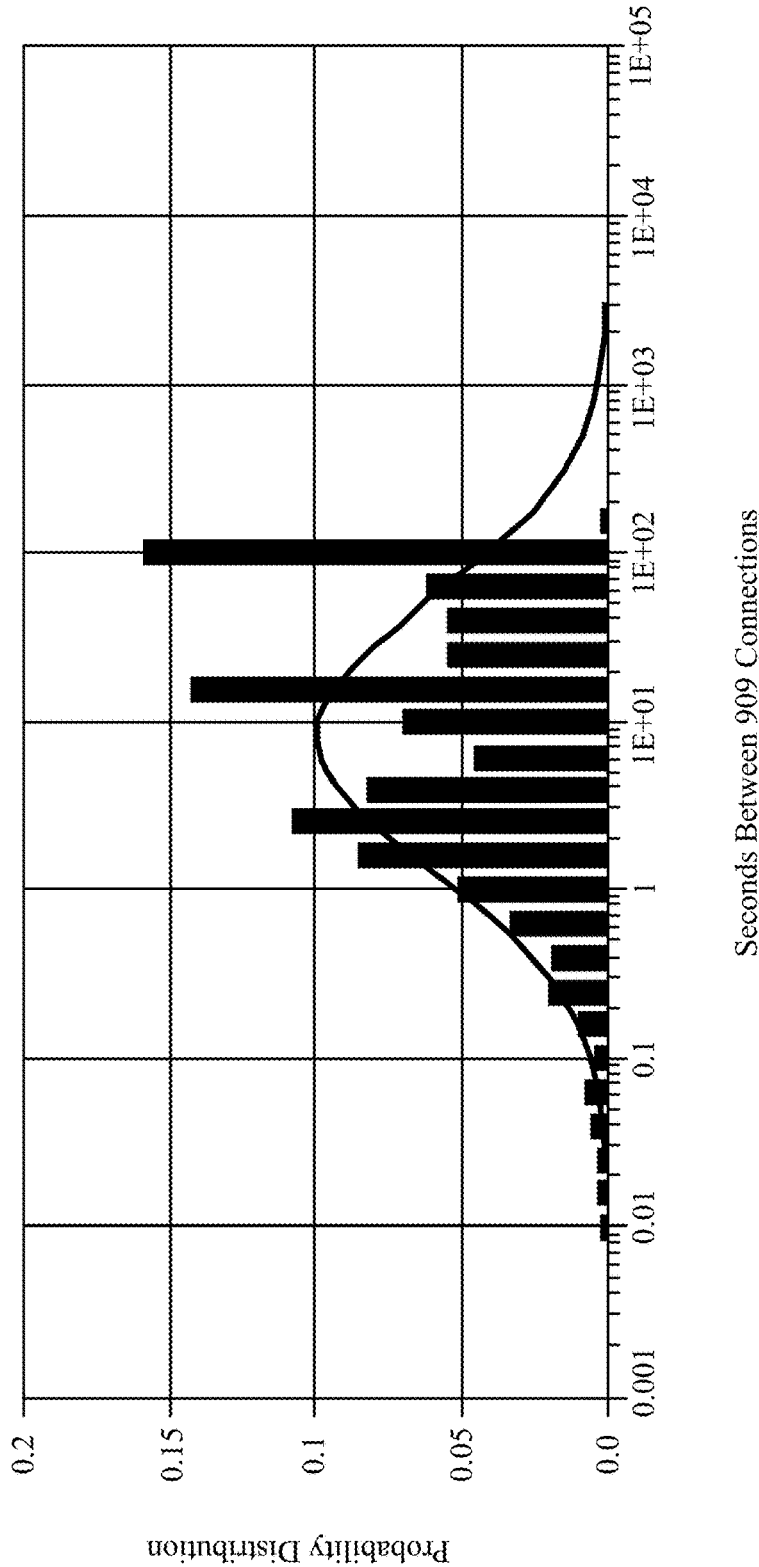
Figure 2B:
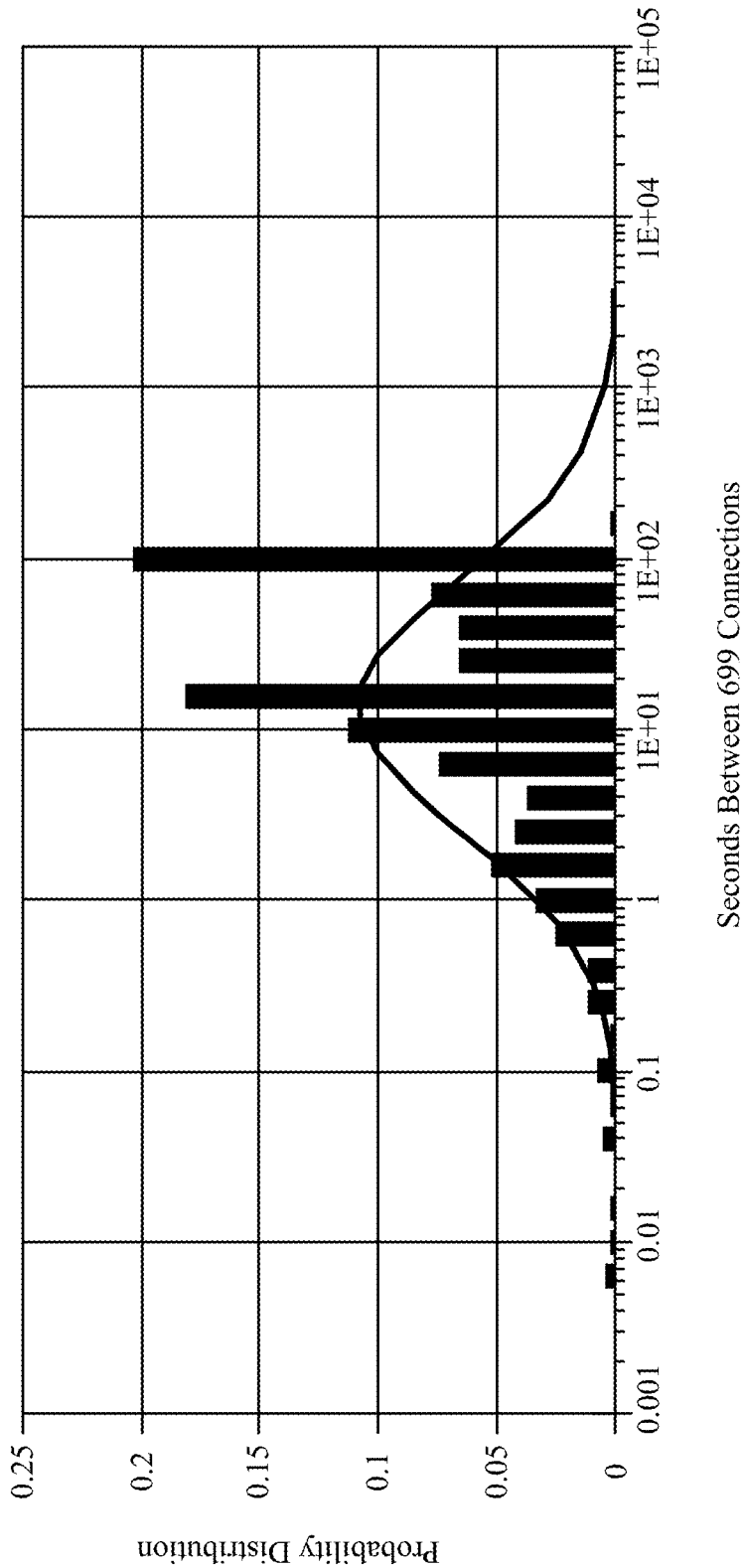
Figure 2B:
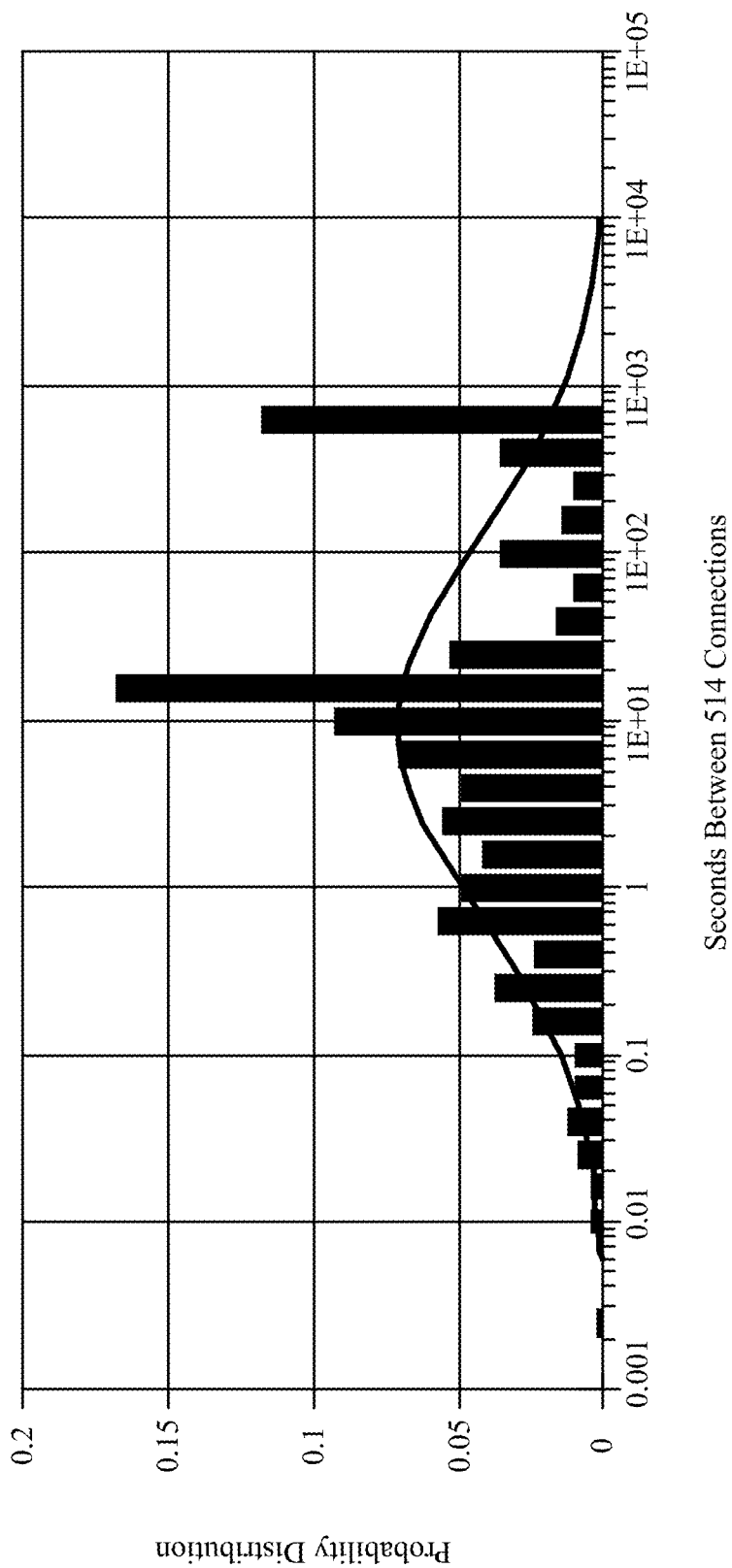
Figure 2B:
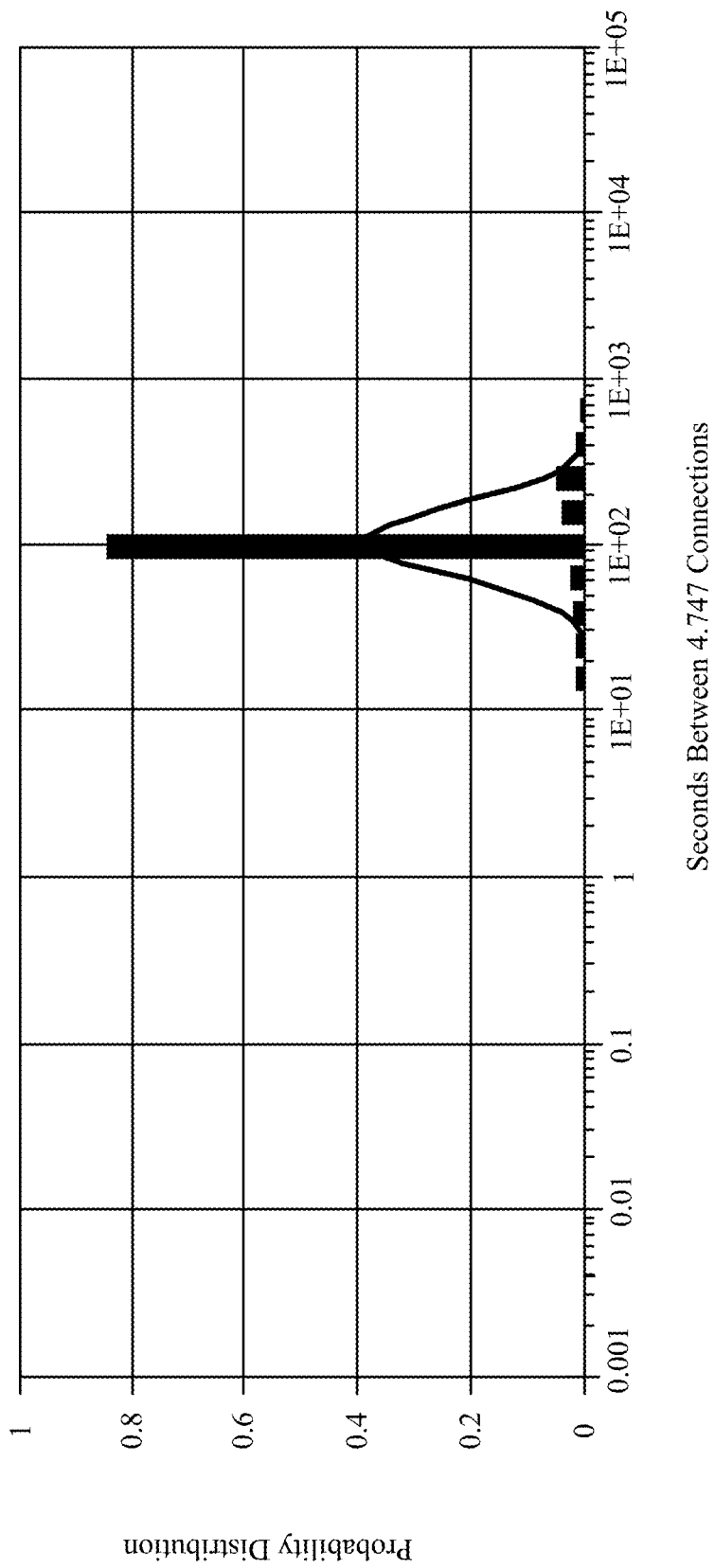
Figure 2B:
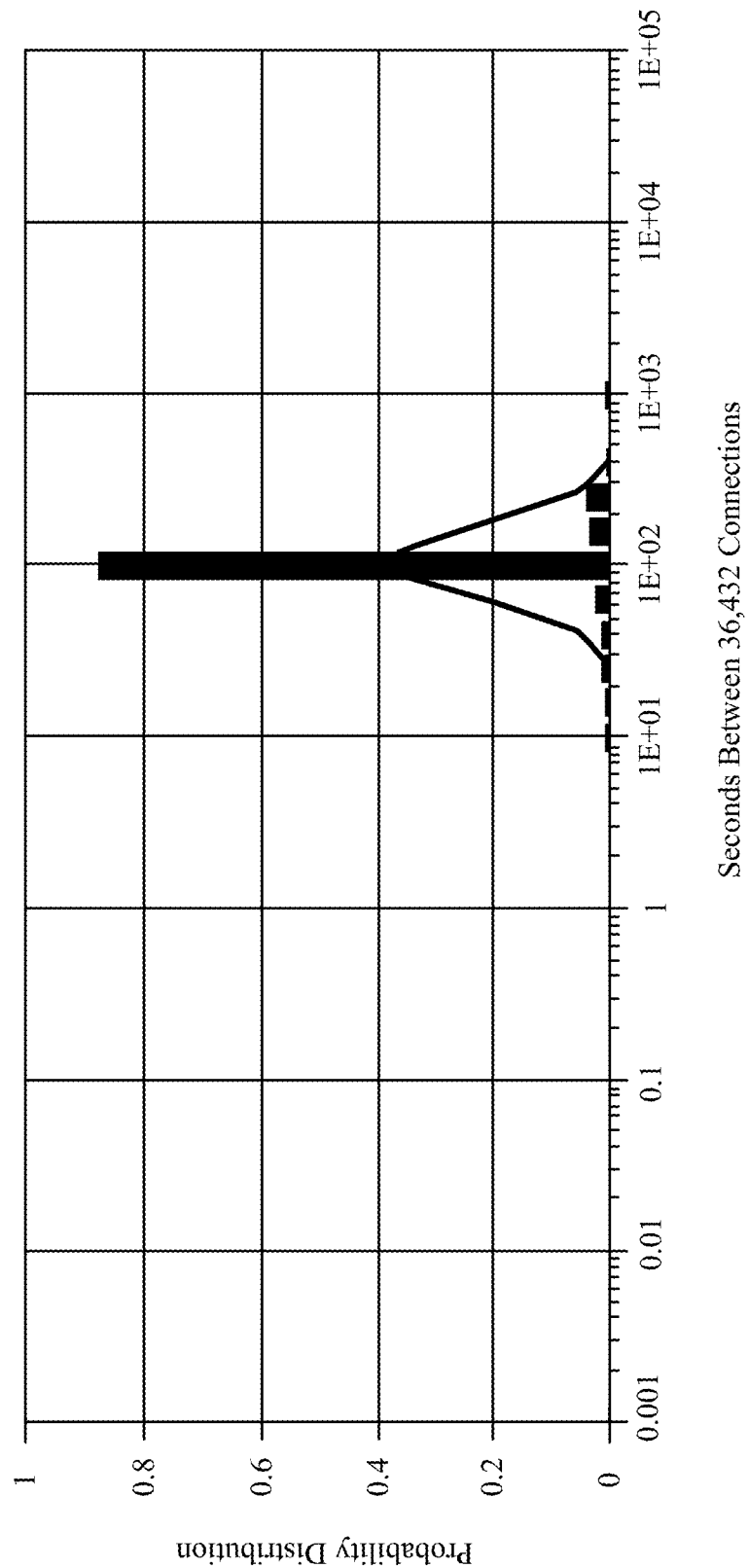

The same source IP created the data sets shown in FIG. 2BB/Graph 30 and FIG. 2BC/FIG. 31. The destination IPs came from Cambodia for FIG. 2BB/Graph 30 and Brazil for FIG. 2BC/Graph 31.

FIG. 2BE/Graph 33 and FIG. 2BF/Graph 34 had an unknown source location but different IP addresses. The source IP for FIG. 2BE/Graph 33 was xx.xxx.xxx.104. The source IP for FIG. 2BF/Graph 34 was xx.xxx.xxx.103. As the time spans for the two data sets do not appear to overlap, these probably are the same computer with a different IP address.

FIG. 2AR/Graph 20 may illustrate a bot score of 0.4 and a RITA timestamp score of 0.826.

The main reason FIG. 2AR/Graph 20 has such a low bot score is because most of the bins represent timestamp intervals of less than two seconds. This region, as explained previously, is ignored in computing the bot score.

FIG. 2AS/Graph 21 may illustrate a bot score of 2.3 and a RITA timestamp score of 0.784.

FIG. 2AT/Graph 22 may illustrate a bot score of 2.7 and a RITA timestamp score of 0.599.

FIG. 2AU/Graph 23 may illustrate a bot score of 7.2 and a RITA timestamp score of 0.532.

FIG. 2AV/Graph 24 may illustrate a bot score of 10.7 and a RITA timestamp score of 0.513.

FIG. 2AW/Graph 25 may illustrate a bot score of 16.7 and a RITA timestamp score of 0.364.

FIG. 2AX/Graph 26 may illustrate a bot score of 21.1 and a RITA timestamp score of 0.520.

FIG. 2AY/Graph 27 may illustrate a bot score of 25.0 and a RITA timestamp score of 0.671.

FIG. 2AZ/Graph 28 may illustrate a bot score of 27.0 and a RITA timestamp score of 0.207.

FIG. 2BA/Graph 29 may illustrate a bot score of 35.7 and a RITA timestamp score of 0.809.

FIG. 2BB/Graph 30 may illustrate a bot score of 45.7 and a RITA timestamp score of 0.445.

FIG. 2BC/Graph 31 may illustrate a bot score of 54.5 and a RITA timestamp score of 0.308.

FIG. 2BD/Graph 32 may illustrate a bot score of 81.8 and a RITA timestamp score of 0.511.

FIG. 2BE/Graph 33 may illustrate a bot score of 92.3 and a RITA timestamp score of 0.581.

FIG. 2F/Graph 34 may illustrate a bot score of 127.2 and a RITA timestamp score of 0.588.

High bot scores do not necessarily mean a bot 150 is beaconing to a command and control server 160. They only mean the traffic between the two computers is different from normal traffic in their timestamp interval probability distribution. Similarly, there is no Bot Score which indicates a true negative indication of a bot. A bot 150 can completely camouflage the timestamp probability distribution.

In response to locating a probable bot 150, a variety of actions may be taken in response. The system and method on the network 140 may block all outward communications from the bot 150. The system and method may also block all communications to and from the receiving address. The receiving address may be added to a list of addresses to be blocked in the future on this network 140 and other networks. The system and method also may search and identify the bot code and remove the code from the network 140. The bot code may be analyzed such that additional instances of the code or similar code may be found and neutralized. The code may also be added to a database such that others may search and neutralize the code on other networks. Finally, an analysis may be undertaken to determine how the code entered the network and remained hidden for a period of time and this analysis may be shared with others.

The system and method for detection of malicious traffic has been developed with a strong probability theory basis. This well-developed theory and practical application to the domain of bot 150 detection represents a major leap forward in the detection of bots. The evidence of this conclusion is visible in the mathematical foundation, the visual presentation of the data, and in the bot 150 scores compared to the same components of RITA which is an existing state of the art bot detection tool. The system is more than just speeding a process but uses a computing system to achieve a better outcome, increase computer security, reduce undesired computer communications and improve network efficiency.

Figure 4:
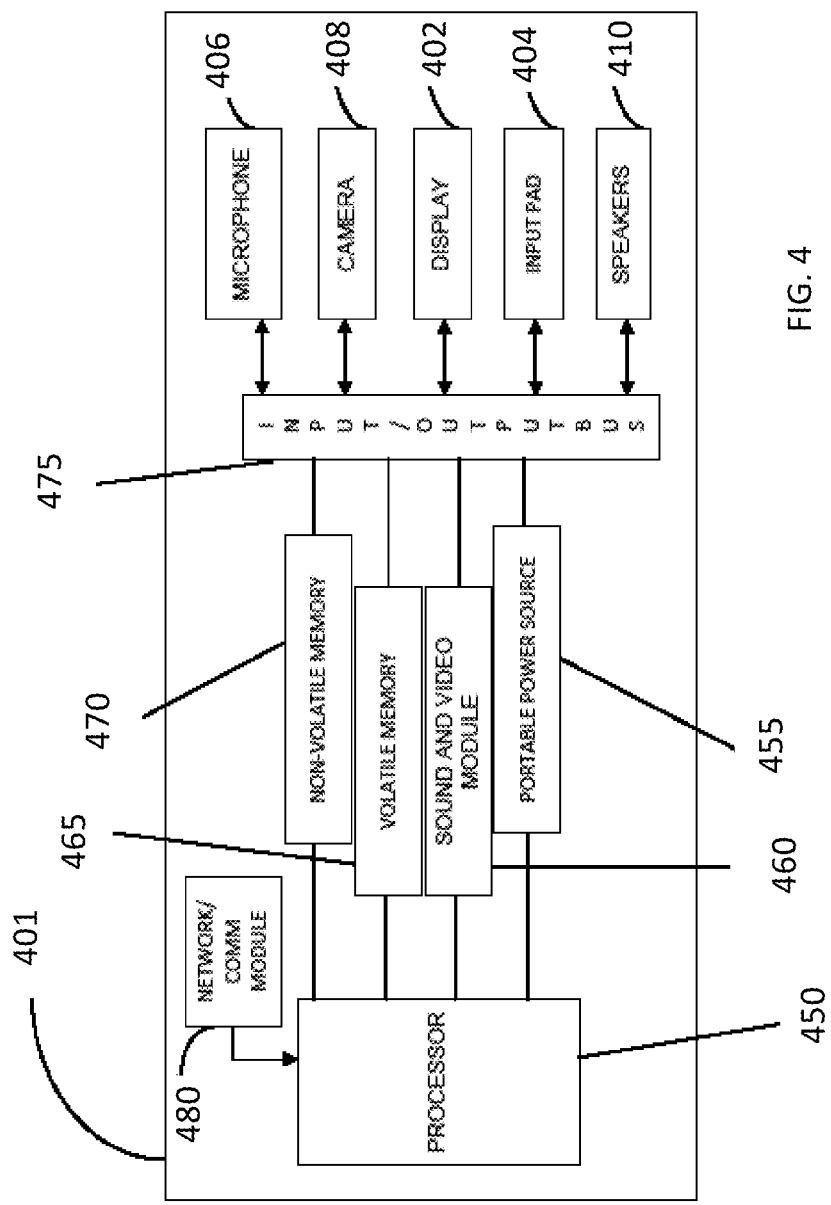
FIG. 4 illustrates a sample mobile computing device.

FIG. 4 may be a high level illustration of a portable computing device 401 communicating with a remote computing device 541 in FIG. 5 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 401 may be a mobile device 401 that operates using a portable power source 455 such as a battery. The portable computing device 401 may also have a display 402 which may or may not be a touch sensitive display. More specifically, the display 402 may have a capacitance sensor, for example, that may be used to provide input data to the portable computing device 401. In other embodiments, an input pad 404 such as arrows, scroll wheels, keyboards, etc., may be used to provide inputs to the portable computing device 401. In addition, the portable computing device 401 may have a microphone 406 which may accept and store verbal data, a camera 408 to accept images and a speaker 410 to communicate sounds.

The portable computing device 401 may be able to communicate with a computing device 541 or a plurality of computing devices 541 that make up a cloud of computing devices 541. The portable computing device 401 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 541 or may be through a communication network such as cellular service, through the Internet, through a private network, through BLUETOOTH, etc., via a network or communication module 480.

The portable computing device 401 may have a processor 450 that is physically configured according to computer executable instructions. It may have a portable power supply 455 such as a battery which may be rechargeable. It may also have a sound and video module 460 which assists in displaying video and sound and may turn off when not in use to conserve power and battery life. The portable computing device 401 may also have non-volatile memory 470 and volatile memory 465. The network or communication module 480 may have GPS, BLUETOOTH, NFC, cellular or other communication capabilities. In one embodiment, some or all of the network or communication capabilities may be separate circuits or may be part of the processor 450. There also may be an input/output bus 475 that shuttles data to and from the various user input devices such as the microphone 406, the camera 408 and other inputs, such as the input pad 404, the display 402, and the speakers 410, etc. It also may control communicating with the networks, either through wireless or wired devices. Of course, this is just one embodiment of the portable computing device 401 and the number and types of portable computing devices 401 is limited only by the imagination.

The physical elements that make up the remote computing device 541 may be further illustrated in FIG. 5. At a high level, the computing device 541 may include a digital storage such as a magnetic disk, an optical disk, flash storage, non-volatile storage, etc. Structured data may be stored in the digital storage such as in a database. The server 541 may have a processor 500 that is physically configured according to computer executable instructions. It may also have a sound and video module 505 which assists in displaying video and sound and may turn off when not in use to conserve power and battery life. The server 541 may also have volatile memory 510 and non-volatile memory 515.

The database 525 may be stored in the memory 510 or 515 or may be separate. The database 525 may also be part of a cloud of computing device 541 and may be stored in a distributed manner across a plurality of computing devices 541. There also may be an input/output bus 520 that shuttles data to and from the various user input devices such as the microphone 406, the camera 408, the inputs such as the input pad 404, the display 402, and the speakers 410, etc. The input/output bus 520 may also connect to similar devices of the microphone 406, the camera 408, the inputs such as the input pad 404, the display 402, and the speakers 410, or other peripheral devices, etc. The input/output bus 520 also may interface with a network or communication module 530 to control communicating with other devices or computer networks, either through wireless or wired devices. In some embodiments, the application may be on the local computing device 401 and in other embodiments, the application may be remote 541. Of course, this is just one embodiment of the server 541 and the number and types of portable computing devices 541 is limited only by the imagination.

The user devices, computers and servers described herein (e.g., 401 or 541) may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithms may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated. Further advantages and modifications of the above described system and method may readily occur to those skilled in the art.

The disclosure, in its broader aspects, is therefore not limited to the specific details, representative system and methods, and illustrative examples shown and described above. For example, the elements represented by the x axis and the y axis may be switched without departing from the invention. Various modifications and variations may be made to the above specification without departing from the scope or spirit of the present disclosure, and it is intended that the present disclosure covers all such modifications and variations provided they come within the scope of the following claims and their equivalents.

The invention claimed is:

1. A method of identifying unauthorized bot communications comprising:
    collecting details on communications from a first computer to a second computer through a network;
    creating analysis bins comprising:
        determining a bin connection count wherein the bin connection count comprises a number of connections in one of the analysis bins;
    using the bin connection count as a y axis measure;
    determining a bin width wherein the bin width comprises determining a logarithm of a predetermined base of a time span, multiplying the bin width by a number of desired bins for each 10 fold increase in timestamp interval;
    determining a bin number for a given time span comprising:
    taking the logarithm of a predetermined base of the time span to determine a time result, multiplying the time result by the number of the desired bins for each 10 fold increase in time span interval to determine a bin result; and
    using the integer portion of the bin result as the bin number;
    analyzing the bins comprising:
    creating a normal/Gaussian distribution for the plurality of the bins;
    comparing the number of connections in each of the analysis bins to Gaussian distribution applied to the bins;
    determining a rating wherein the rating indicates the lack of similarity to Gaussian distribution and more likely bot behavior; and
    analyzing connections in the each of the analysis bins with the rating over a threshold for additional unauthorized bot characteristics to determine if the communication is coming from an unauthorized bot;
    identifying unauthorized bots based on the results of the analyzed connections.

2. The method of claim 1 wherein the details on communication comprise a timestamp for the communications from a first computer to a second computer through a network.

3. The method of claim 1, wherein a determining rating comprises:
    determining an expected probability, ep, of a value falling in bin b from normal model Gaussian probability density;
    determining the expected number of events;
    ignoring bins when the expected number of events is less than q bin ceiling or represent connections less than a connection time ceiling; two seconds apart;
    subtracting the expected probability of a bin from the observed probability of the bin to determine a bin difference; and
    multiplying the bin difference by a scale factor to create the rating.

4. The method of claim 3, wherein the bin ceiling comprises a range of 5 + or −1.

5. The method of claim 3, wherein the connection time ceiling comprises a range apart of two seconds plus or minus one.

6. The method of claim 1, wherein a beginning time span is one millisecond.

7. The method of claim 1, wherein three to ten bins are created per each 10 fold increase in time stamp interval of the communications from a first computer to a second computer through a network.

8. The method of claim 1, wherein the predetermined base is base is in the range of 9-11.

9. The method of claim 1, further comprising dividing the bin connection count by a total number of connections being analyzed to create a normalized y axis measure.

10. The method of claim 1, wherein the time span comprises the time between each successive connection between the two computers.

11. The method of claim 1, wherein determining a rating wherein the rating indicates the lack of similarity to Gaussian distribution and more likely bot behavior comprises one of the group comprising:
  an absolute value of the mean error from the Gaussian curve;
  a minimum threshold of deviation from the Gaussian probability at one or more bin locations could also be used to indicate various levels of suspicion; and
  a maximum deviation from the Gaussian probability a mean squared error from the Gaussian curve.

12. A computer system comprising a processor, a memory and an input-output circuit, the processor being physically configured according to computer executable instructions for:
  collecting details on communications from a first computer to a second computer through a network;
  creating analysis bins comprising:
  determining a bin connection count wherein the bin connection count comprises a number of connections in one of the analysis bins;
  using the bin connection count as a y axis measure;
  determining a bin width wherein the bin width comprises determining a logarithm of a predetermined base of a time span, multiplying the bin width by a number of desired bins for each 10 fold increase in timestamp interval;
  determining a bin number for a given time span comprising:
  taking the logarithm of a predetermined base of the time span to determine a time result, multiplying the time result by the number of the desired bins for each 10 fold increase in time span interval to determine a bin result; and
  using the integer portion of the bin result as the bin number;
  analyzing the bins comprising:
  creating a normal/Gaussian distribution for the plurality of the bins;
  comparing the number of connections in each of the analysis bins to Gaussian distribution applied to the bins;
  determining a rating wherein the rating indicates the lack of similarity to Gaussian distribution and more likely bot behavior; and
  analyzing connections in the each of the analysis bins with the rating over a threshold for additional unauthorized bot characteristics to determine if the communication is coming from an unauthorized bot;
  identifying unauthorized bots based on the results of the analyzed connections.

13. The computer system of claim 12 wherein the details on communication comprise a timestamp for the communications from a first computer to a second computer through a network.

14. The computer system of claim 12, wherein determining a rating comprises computer executable instructions for:
  determining an expected probability, ep, of a value falling in bin b from normal model Gaussian probability density;
  determining the expected number of events;
  ignoring bins when the expected number of events is less than q bin ceiling or represent connections less than a connection time ceiling; two seconds apart;
  subtracting the expected probability of a bin from the observed probability of the bin to determine a bin difference; and
  multiplying the bin difference by a scale factor to create the rating.

15. The computer system of claim 12, wherein three to ten bins are created per each 10 fold increase in time stamp interval of the communications from a first computer to a second computer through a network.

16. The computer system of claim 12, wherein the predetermined base is base is in the range of 9-11.

17. The computer system of claim 12, further comprising dividing the bin connection count by a total number of connections being analyzed to create a normalized y axis measure.

18. The computer system of claim 12, wherein determining a rating wherein the rating indicates the lack of similarity to Gaussian distribution and more likely bot behavior comprises one of the group comprising:
  an absolute value of the mean error from the Gaussian curve;
  a minimum threshold of deviation from the Gaussian probability at one or more bin locations could also be used to indicate various levels of suspicion; and
  a maximum deviation from the Gaussian probability a mean squared error from the Gaussian curve.

19. A non-transitory tangible computer readable medium comprising computer executable instructions for:
  collecting details on communications from a first computer to a second computer through a network;
  creating bins for analysis comprising:
  determining a bin connection count wherein the bin connection count comprises a number of connections in one of the bins;
  using the bin connection count as a y axis measure;
  determining a bin width wherein the bin width comprises determining a logarithm of a predetermined base of a time span, multiplying the bin width by a number of desired bins for each 10 fold increase in timestamp interval;
  determining a bin number for a given time span comprising:
  taking the logarithm of a predetermined base of the time span to determine a time result, multiplying the time result by the number of desired bins for each 10 fold increase in time span interval to determine a bin result; and
  using the integer portion of the bin result as the bin number;
  analyzing the bins comprising:
  creating a normal/Gaussian distribution for the plurality of the bins;
  comparing the number of connections in each of the bins to Gaussian distribution applied to the bins;
  determining a rating wherein the rating indicates the lack of similarity to Gaussian distribution and more likely bot behavior; and
  analyzing connections in the each of the bins with the rating over a threshold for additional unauthorized bot characteristics to determine if the communication is coming from an unauthorized bot;
  identifying unauthorized bots based on the results of the analyzed connections.

20. The non-transitory tangible computer readable medium of claim 19, wherein determining a rating comprises computer executable instructions for:

determining an expected probability, ep, of a value falling in bin b from normal model Gaussian probability density;

determining the expected number of events;

ignoring bins when the expected number of events is less than q bin ceiling or represent connections less than a connection time ceiling; two seconds apart;

subtracting the expected probability of a bin from the observed probability of the bin to determine a bin difference; and multiplying the bin difference by a scale factor to create the rating.

* * * * *